(12) United States Patent
Kubota et al.

(10) Patent No.: US 12,581,378 B2
(45) Date of Patent: Mar. 17, 2026

(54) IDLE MODE MOBILITY IN ULTRA LOW POWER SYSTEMS

(71) Applicant: InterDigital Patent Holdings, Inc., Wilmington, DE (US)

(72) Inventors: Keiichi Kubota, Tokyo (JP); Hussain Elkotby, Conshohocken, PA (US); Ravikumar Pragada, Warrington, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 320 days.

(21) Appl. No.: 18/289,305

(22) PCT Filed: May 17, 2022

(86) PCT No.: PCT/US2022/029567
§ 371 (c)(1),
(2) Date: Nov. 2, 2023

(87) PCT Pub. No.: WO2022/245778
PCT Pub. Date: Nov. 24, 2022

(65) Prior Publication Data
US 2024/0236739 A1 Jul. 11, 2024

Related U.S. Application Data

(60) Provisional application No. 63/189,498, filed on May 17, 2021.

(51) Int. Cl.
*H04B 17/20* (2015.01)
*H04B 17/382* (2015.01)
(Continued)

(52) U.S. Cl.
CPC ...... *H04W 36/0085* (2018.08); *H04B 17/252* (2023.05); *H04B 17/382* (2015.01);
(Continued)

(58) Field of Classification Search
CPC . H04B 7/02–12; H04B 17/0082–3913; H04W 16/24–32; H04W 24/02–10;
(Continued)

(56) References Cited

U.S. PATENT DOCUMENTS

| | | | |
|---|---|---|---|
| 8,942,205 B2 | 1/2015 | Mach et al. | |
| 2008/0227453 A1 | 9/2008 | Somasundaram et al. | |
| 2020/0382189 A1 | 12/2020 | Chen et al. | |

FOREIGN PATENT DOCUMENTS

EP 3047677 B1 11/2019

OTHER PUBLICATIONS

3GPP TS 38.304 V16.4.0, 3rd Generation Partnership Project; Technical Specification Group Radio Access Network; NR; User Equipment (UE) procedures in Idle mode and RRC, Inactive state (Release 16), Mar. 2021.
(Continued)

*Primary Examiner* — Timothy J Weidner
(74) *Attorney, Agent, or Firm* — Condo Roccia Koptiw LLP

(57) ABSTRACT

Systems, methods, and instrumentalities are described herein for idle mode mobility in an ultra-low power (ULP) system. Idle mode mobility in a ULP system may support energy efficient downlink signaling. An association may be identified between a Uu cell and a ULP cell. Switching between Uu cells may limit power savings gains from ULP receivers. Enabling switching between ULP cells without switching between Uu cells may help maintain the power savings gains from ULP receivers. A wireless transmit/receive unit may be configured to perform ULP cell reselection, for example, without triggering Uu cell reselection (e.g., to maintain power savings gains).

15 Claims, 27 Drawing Sheets

(51) Int. Cl.

| | |
|---|---|
| *H04W 24/08* | (2009.01) |
| *H04W 24/10* | (2009.01) |
| *H04W 36/00* | (2009.01) |
| *H04W 36/04* | (2009.01) |
| *H04W 36/08* | (2009.01) |
| *H04W 36/16* | (2009.01) |
| *H04W 36/30* | (2009.01) |
| *H04W 36/36* | (2009.01) |
| *H04W 48/18* | (2009.01) |
| *H04W 48/20* | (2009.01) |
| *H04W 52/02* | (2009.01) |
| *H04W 76/25* | (2018.01) |
| *H04W 76/27* | (2018.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC ........... *H04W 24/08* (2013.01); *H04W 24/10* (2013.01); *H04W 36/04* (2013.01); *H04W 36/08* (2013.01); *H04W 36/165* (2013.01); *H04W 36/30* (2013.01); *H04W 36/36* (2013.01); *H04W 48/18* (2013.01); *H04W 48/20* (2013.01); *H04W 52/0203* (2013.01); *H04W 52/0245* (2013.01); *H04W 76/25* (2018.02); *H04W 76/27* (2018.02); *H04W 84/02* (2013.01); *H04W 88/02* (2013.01); *H04W 88/08* (2013.01); *H04W 92/02* (2013.01); *H04W 92/10* (2013.01); *Y02D 30/70* (2020.08)

(58) Field of Classification Search
CPC ........... H04W 36/0005–385; H04W 48/02–20; H04W 52/02–60; H04W 60/005–06; H04W 72/02–569; H04W 76/10–50; H04W 84/02–16; H04W 88/02–12; H04W 92/02–04; H04W 92/10; Y02D 30/70

See application file for complete search history.

(56) References Cited

OTHER PUBLICATIONS

3GPP TS 38.133 V17.1.0, 3rd Generation Partnership Project; Technical Specification Group Radio Access Network; NR; Requirements for support of radio resource management (Release 17), Mar. 2021.

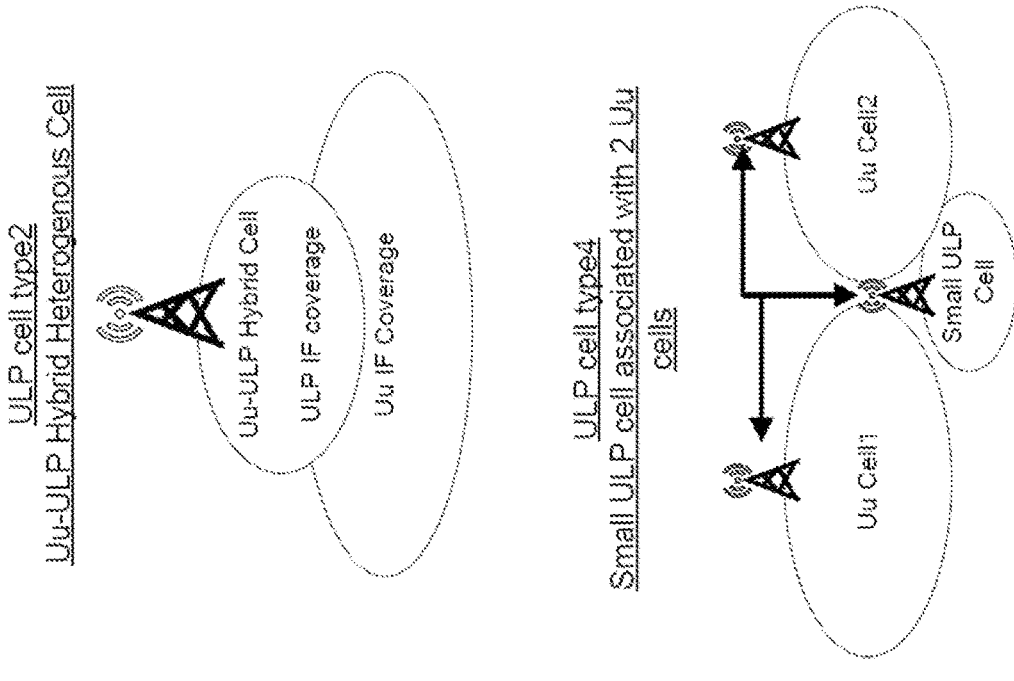
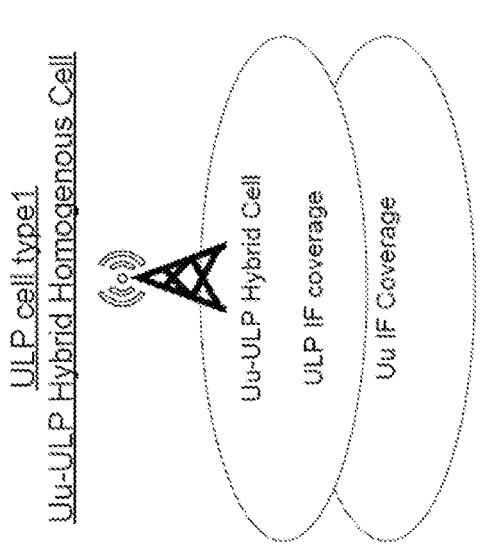
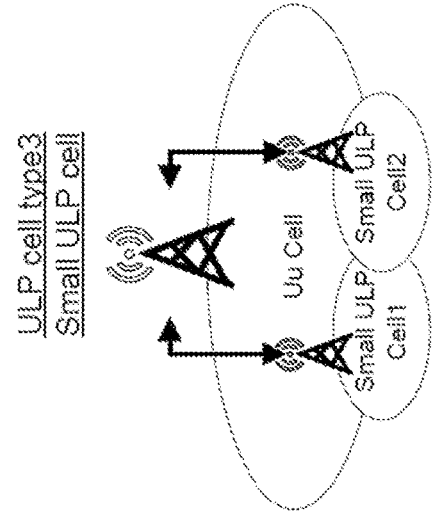
FIG. 2

FIG. 4A

ULP cell type1
Uu-ULP Hybrid Homogenous Cell

Uu-ULP Hybrid Cell

ULP IF coverage

Uu IF Coverage

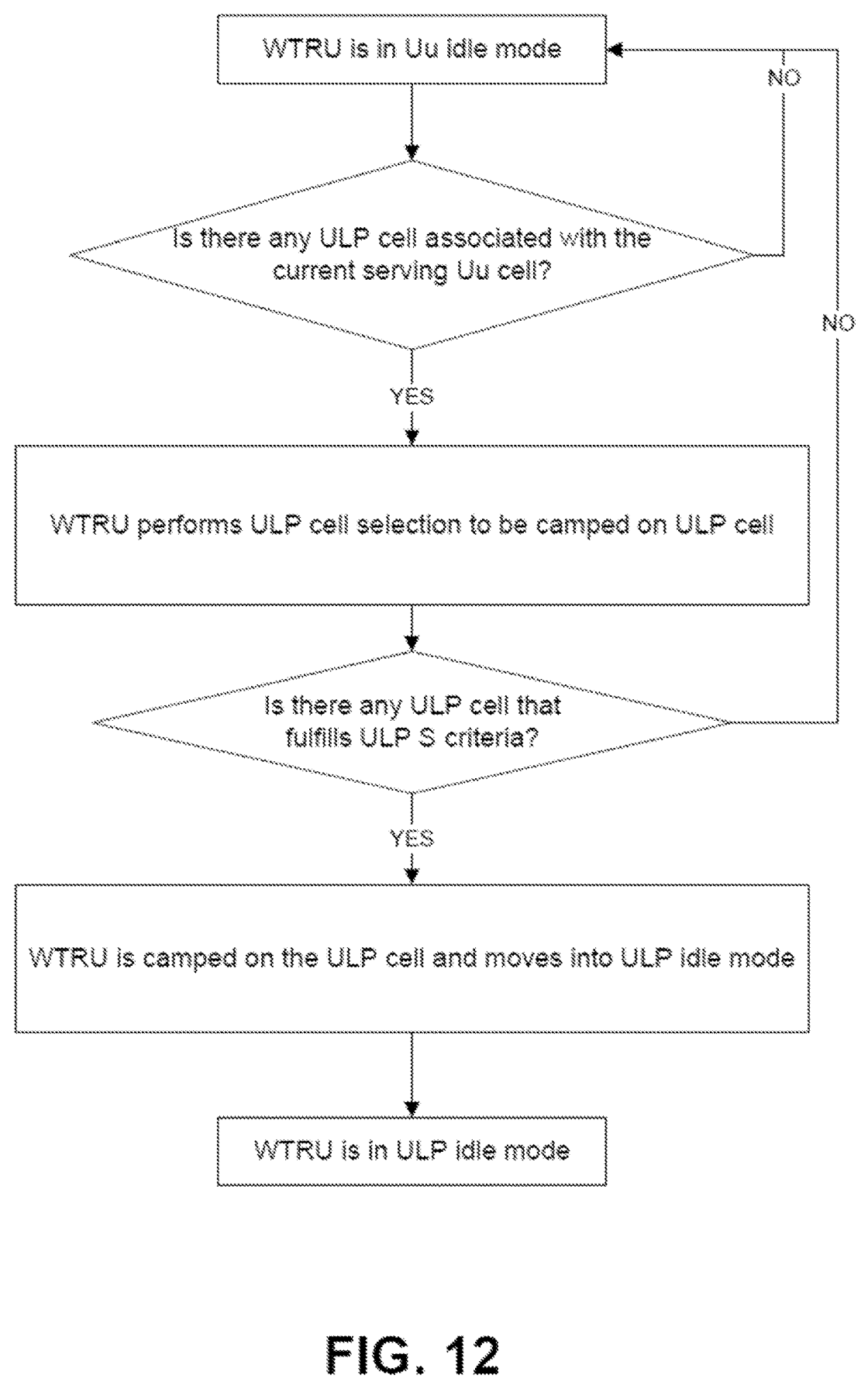

WTRU is in Uu idle mode

Is there any ULP cell associated with the current serving Uu cell?

NO

NO

YES

WTRU performs ULP cell selection to be camped on ULP cell

Is there any ULP cell that fulfills ULP S criteria?

YES

WTRU is camped on the ULP cell and moves into ULP idle mode

WTRU is in ULP idle mode

FIG. 12

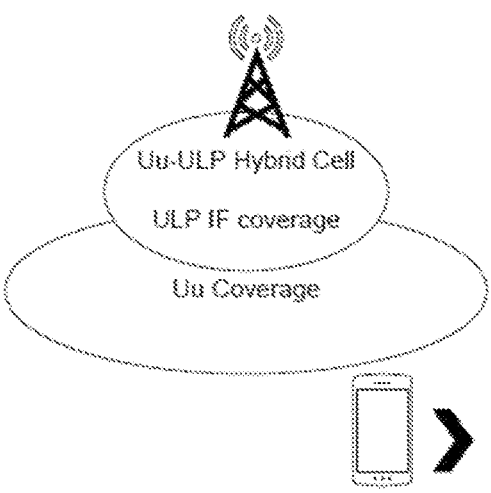

Uu-ULP Hybrid Cell

ULP IF coverage

Uu Coverage

FIG. 16

WTRU is in Uu idle mode

WTRU determines RSRP of ULPRS and then determines the pathloss based on the TX power of ULPRS and the measured RSRP of ULPRS Is the pathloss less than or equal to "ThreshUUSearchPathLoss"?

NO

YES

Does the associated Uu cell fulfill S criteria?

YES

NO

WTRU is camped on the Uu cell and moves into Uu idle mode

WTRU initiates Uu selection

WTRU is in Uu idle mode

WTRU is in Uu idle mode

IDLE MODE MOBILITY IN ULTRA LOW POWER SYSTEMS

CROSS-REFERENCE TO RELATED APPLICATIONS

The application is the National Stage Entry under 35 U.S.C. § 371 of Patent Cooperation Treaty Application No. PCT/US2022/029567, filed May 17, 2022, which claims the benefit of U.S. Provisional Application 63/189,498, filed May 17, 2021, the contents of which are incorporated by reference in their entirety herein.

BACKGROUND

Mobile communications using wireless communication continue to evolve. A fifth generation of mobile communication radio access technology (RAT) may be referred to as 5G new radio (NR). A previous (legacy) generation of mobile communication RAT may be, for example, fourth generation (4G) long term evolution (LTE).

SUMMARY

Systems, methods, and instrumentalities are described herein for idle mode mobility in an ultra-low power (ULP) system. Idle mode mobility in a ULP system may support energy efficient downlink signaling. An association may be identified between a Uu cell and a ULP cell. Switching between Uu cells may limit power savings gains from ULP receivers. Enabling switching between ULP cells without switching between Uu cells may help maintain the power savings gains from ULP receivers. A wireless transmit/receive unit may be configured to perform ULP cell reselection, for example, without triggering Uu cell reselection (e.g., to maintain power savings gains).

A WTRU may be connected to a serving Uu cell (e.g., first Uu cell) and a serving ULP cell (e.g., first ULP cell) that is associated with the serving Uu cell. The WTRU may be configured to determine whether a first measurement associated with the serving ULP cell is below a threshold (e.g., ULP reselection threshold). The WTRU may be configured to perform measurements on neighboring ULP cells (e.g., second ULP cell associated with the serving Uu cell and a third ULP cell associated with a second Uu cell), for example, if the first measurement is below the first threshold. The WTRU may be configured to determine measurement offsets for the neighboring ULP cells. The offsets_____. The WTRU may be configured to determine a signal quality associated with the neighboring ULP cells. For example, the WTRU may determine the signal quality associated with the second ULP cell based on the measurement performed on the second ULP (e.g., without considering an offset, for example, because the second ULP cell is associated with the serving Uu cell). For example, the WTRU may determine the signal quality associated with the third ULP cell based on the measurement performed on the third ULP cell and the determined measurement offset for the third ULP cell (e.g., because the third ULP cell is associated with the second Uu cell, which is not the serving Uu cell). The WTRU may be configured to select a ULP cell from the neighboring ULP cells based on the signal qualities. The selected ULP cell may be selected, for example, based on having the highest signal quality. The WTRU may camp on (e.g., connect to) the selected ULP cell using configuration information associated with the selected ULP cell. If the selected ULP cell is associated with a different Uu cell from the serving Uu cell, the WTRU may be configured to camp on (e.g., connect to) the different Uu cell. The WTRU may be configured to camp on a different Uu cell, for example, based on a connection establishment latency constraint.

The WTRU may be configured to detect an out-of-ULP service event. The detection of the out-of-ULP service event may be based on a determination that the first measurement and measurements associated with neighboring ULP cells are below a second threshold. The WTRU may be configured to perform Uu cell reselection, for example, based on detecting an out-of-ULP service event. The WTRU may be configured to obtain Uu configuration information with a third Uu cell. The WTRU may be configured to camp on (e.g., connect to) the third Uu cell using the Uu configuration information.

BRIEF DESCRIPTION OF THE DRAWINGS

FIG. 2 illustrates examples of ULP cell types.

FIG. 4A illustrates an example of one or more ULP idle mode mobility procedures.

FIG. 12 illustrates an example of a state transition into ULP idle mode upon Uu cell reselection.

FIG. 16 illustrates an example of leaving ULP coverage of ULP cell type2.

FIG. 17 illustrates an example of a mobility procedure for leaving ULP coverage of ULP cell type2.

FIG. 28 illustrates an example of a ULP registration procedure.

DETAILED DESCRIPTION

Systems, methods, and instrumentalities are described herein for idle mode mobility in an ultra low power (ULP) system. Idle mode mobility in a ULP system may support energy efficient downlink signaling. An association may be identified between a Uu cell and a ULP cell.

ULP idle mode mobility may be implemented, for example, by ULP cell reselection. A signal level for a ULP reference signal (ULPRS) may be determined, for example, based on reference signal received power (RSRP)). An offset may be determined for a (e.g., each) neighboring ULP cell, for example, based on a Uu-ULP cell association. A ranking ULP cell list may be generated, for example, with the RSRP of ULP cells and the Uu-ULP cell association offsets. The highest ranked ULP cell may be selected from the ULP cell list. A WTRU camped on the selected ULP cell may move into ULP idle mode.

A ULP to Uu state transition may occur. A signal level (e.g., RSRP) may be determined for a ULPRS. The signal level may be compared to a threshold. A Uu cell selection may be performed, for example, if the ULPRS signal level is less than or equal to the threshold. A WTRU camped on a suitable Uu cell may move into Uu idle mode.

A Uu to ULP idle mode transition may occur. ULP cell selection may occur (e.g., may be attempted), for example, while a WTRU is camped on a Uu cell, which may have at least one associated ULP cell (e.g., with a periodicity given by a time interval parameter). ULP cell suitability criteria (S criteria) may be evaluated. System information may be acquired from a (e.g., new) suitable ULP cell. A WTRU camped on a ULP cell may move into ULP idle mode.

Figure 1A:
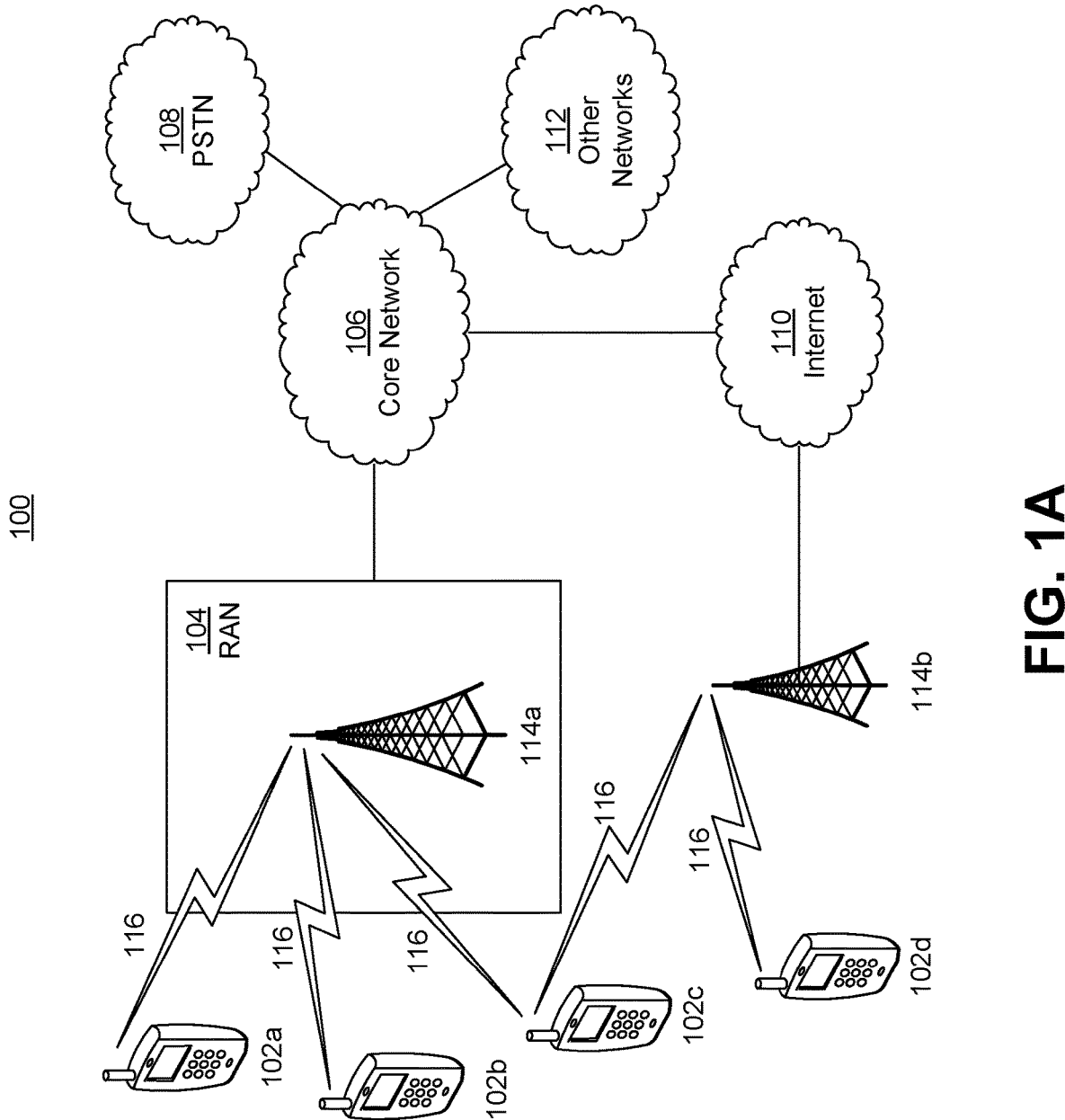
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
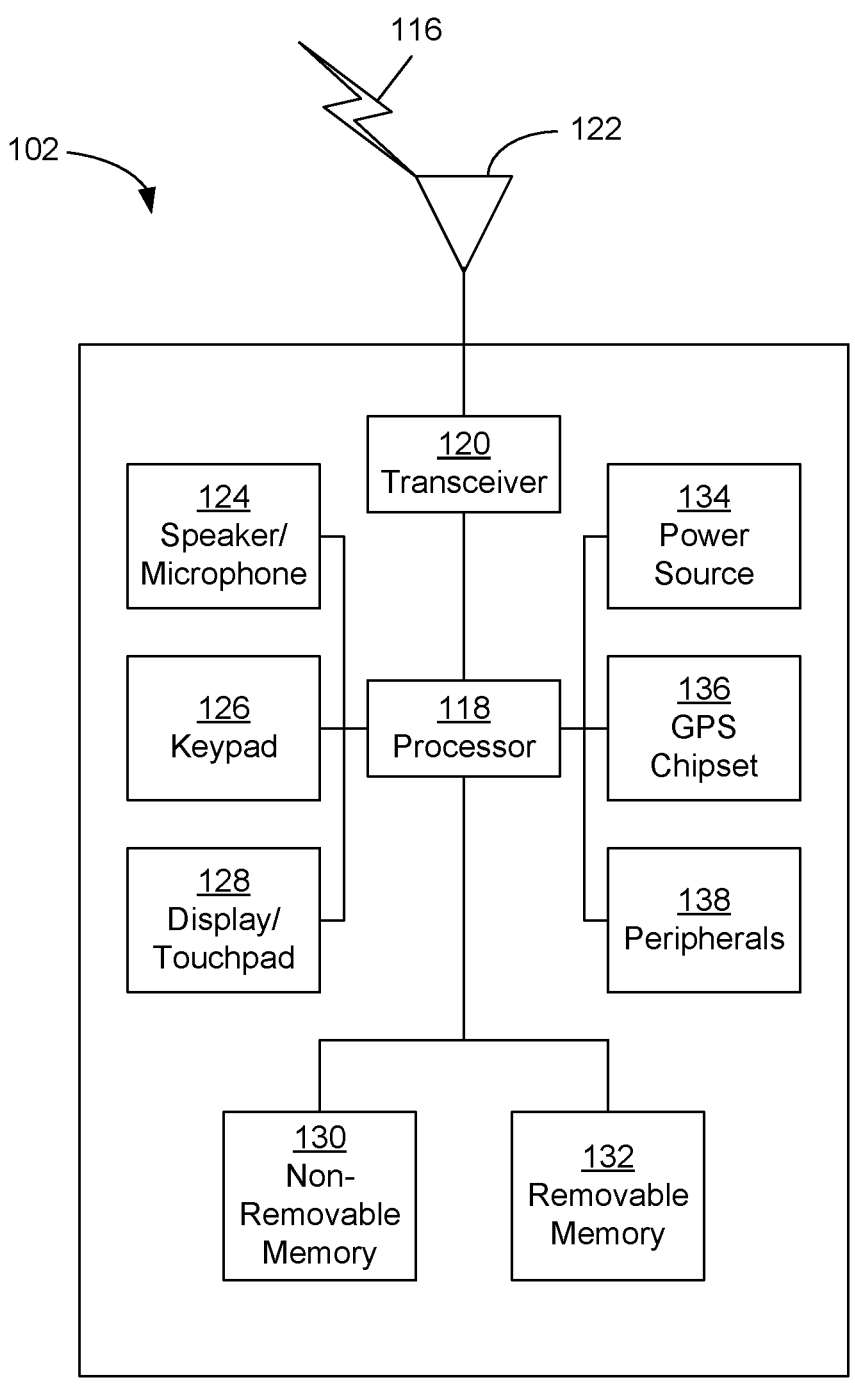
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
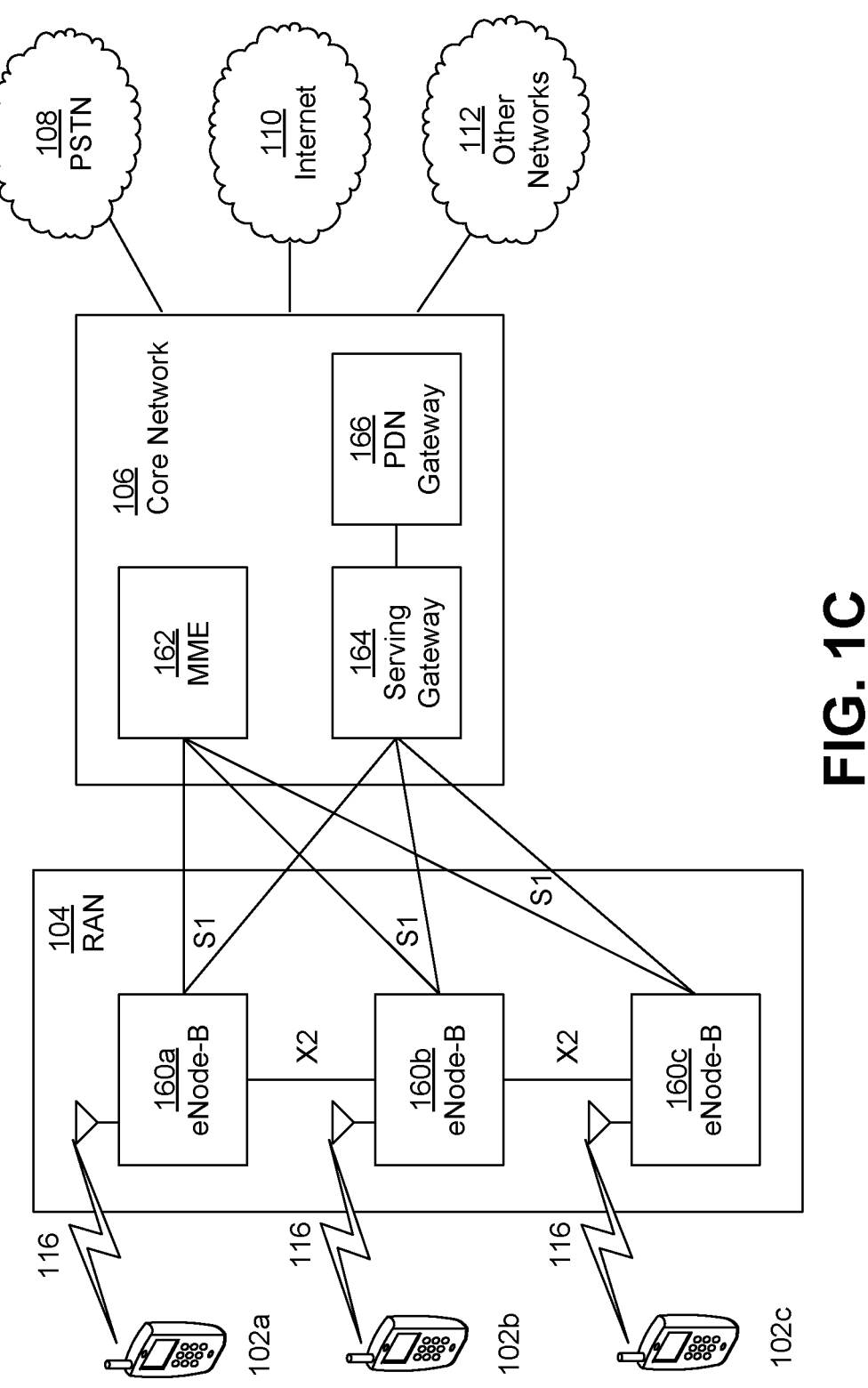
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
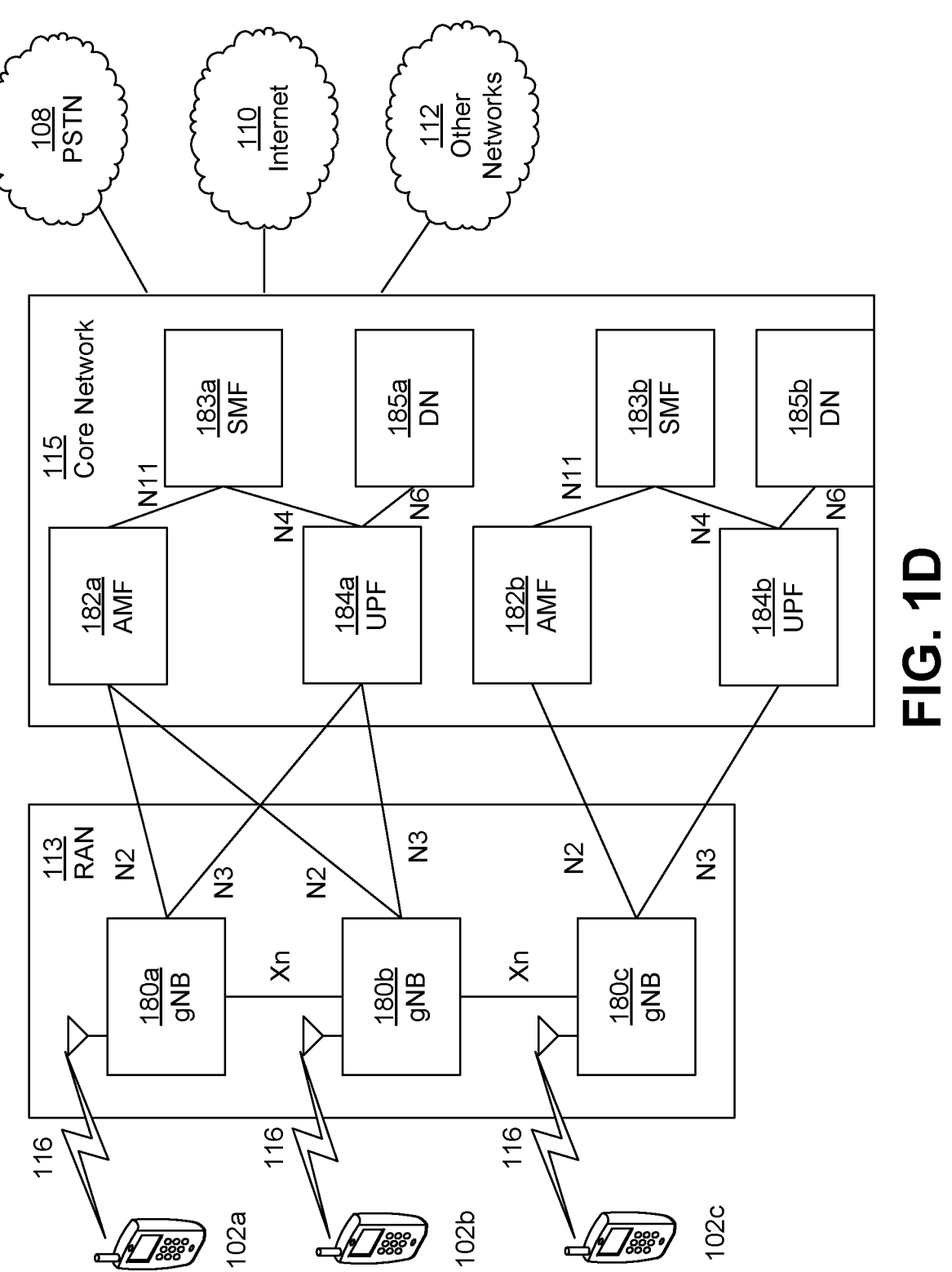
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Systems, methods, and instrumentalities are described herein for idle mode mobility, e.g., associated with an ultra-low power (ULP) system. Idle mode mobility in a ULP system may support energy efficient downlink signaling. An association may be identified between a Uu cell and a ULP cell. Switching between Uu cells may limit power savings gains from ULP receivers. Enabling switching between ULP cells without switching between Uu cells may help maintain the power savings gains from ULP receivers. A wireless transmit/receive unit may be configured to perform ULP cell reselection, for example, without triggering Uu cell reselection (e.g., to maintain power savings gains).

A WTRU may be connected to a serving Uu cell (e.g., first Uu cell) and a serving ULP cell (e.g., first ULP cell) that is associated with the serving Uu cell. The WTRU may be configured to determine whether a first measurement associated with the serving ULP cell is below a threshold (e.g., ULP reselection threshold). The WTRU may be configured to perform measurements on neighboring ULP cells (e.g., second ULP cell associated with the serving Uu cell and a third ULP cell associated with a second Uu cell), for example, if the first measurement is below the first threshold. The WTRU may be configured to determine measurement offsets for the neighboring ULP cells. The offsets_____. The WTRU may be configured to determine a signal quality associated with the neighboring ULP cells. For example, the WTRU may determine the signal quality associated with the second ULP cell based on the measurement performed on the second ULP (e.g., without considering an offset, for example, because the second ULP cell is associated with the serving Uu cell). For example, the WTRU may determine the signal quality associated with the third ULP cell based on the measurement performed on the third ULP cell and the determined measurement offset for the third ULP cell (e.g., because the third ULP cell is associated with the second Uu cell, which is not the serving Uu cell). The WTRU may be configured to select a ULP cell from the neighboring ULP cells based on the signal qualities. The selected ULP cell may be selected, for example, based on having the highest signal quality. The WTRU may camp on (e.g., connect to) the selected ULP cell using configuration information associated with the selected ULP cell. If the selected ULP cell is associated with a different Uu cell from the serving Uu cell, the WTRU may be configured to camp on (e.g., connect to) the different Uu cell. The WTRU may be configured to camp on a different Uu cell, for example, based on a connection establishment latency constraint.

The WTRU may be configured to detect an out-of-ULP service event. The detection of the out-of-ULP service event may be based on a determination that the first measurement and measurements associated with neighboring ULP cells are below a second threshold. The WTRU may be configured to perform Uu cell reselection, for example, based on detecting an out-of-ULP service event. The WTRU may be configured to obtain Uu configuration information with a third Uu cell. The WTRU may be configured to camp on (e.g., connect to) the third Uu cell using the Uu configuration information.

ULP idle mode mobility may be implemented, for example, by ULP cell reselection. A signal level for a ULP reference signal (ULPRS) may be determined, for example, based on a reference signal received power (RSRP). An offset may be determined for a (e.g., each) neighboring ULP cell, for example, based on a Uu-ULP cell association. A ranking ULP cell list may be generated, for example, with the RSRP of ULP cells and the Uu-ULP cell association offsets. The ranked ULP cell (e.g., a highest ranked ULP cell) may be selected from the ULP cell list. A wireless transmit receive unit (WTRU) camped on the selected ULP cell may move into ULP idle mode.

A ULP to Uu state transition may occur. A signal level (e.g., RSRP) may be determined for a ULPRS. The signal level may be compared to a threshold. A Uu cell selection may be performed, for example, if the ULPRS signal level may be less than or equal to the threshold. A WTRU camped on a suitable Uu cell may move into Uu idle mode.

A Uu to ULP idle mode transition may occur. ULP cell selection may occur (e.g., may be attempted), for example, while a WTRU may be camped on a Uu cell, which may have at least one associated ULP cell (e.g., with a periodicity given by a time interval parameter). ULP cell suitability criteria (S criteria) may be evaluated. System information may be acquired from a (e.g., new) suitable ULP cell. A WTRU camped on a ULP cell may move into ULP idle mode.

A reference signal (RS) may be measured by a WTRU (e.g., user equipment (UE)). An RS may be used for mobility decision making. A WTRU may access system information (SI). An ultra-low power (ULP) interface may support downlink signaling with ultra-low energy consumption. A ULP interface may have less (e.g., a relatively smaller) coverage than a Uu interface. A Uu interface may be a radio interface between a base station (e.g., gNB) and a WTRU. The radio interface may support data communication and signaling (e.g., RRC signaling, such as, dedicated radio resource control (RRC) signaling, paging, and/or system information).

Long-battery-life devices may be used, for example, in various internet of things (IOT) devices, small form factor handsets, wearable devices, implantable devices, etc. Passive and/or semi-passive receivers may support (e.g., enable) use cases for long-battery-life devices. Passive and/or semi-passive devices may support lower data rates compared to active devices. Passive and/or semi-passive devices may utilize different waveforms and/or signaling compared to active devices. Networks may support a heterogeneous mix of active, semi-passive, and/or passive devices. Devices may evaluate the quality of a data communication link (e.g., for mobility procedures). Energy consumption levels may be considered to achieve energy efficient deployment, for example, if a network offers passive and semi-passive device support.

In wireless technology (e.g., cellular and WLAN), RF front-ends may be a mix of passive and active components. Passive components may include, for example, receiver/receiving (Rx) antennas, transmitter/transmitting (Tx)/Rx path switches and/or filters. Passive components may use little (e.g., if any) power in order to function. Active components may use power in order to function. Active components may include, for example, an oscillator to tune to a carrier frequency, a low noise amplifier, and/or A/D converters in the Rx path.

RF circuitry may process received RF waveforms collected through an antenna front-end by a receiving device without (e.g., in absence of) an active power supply. A passive receiver may use RF components (e.g., Schottky diodes or micro electro mechanical system (MEMS) RF transformers) to implement functionality (e.g., for voltage amplification, multiplication, and/or signal rectification). Passive receivers may operate in the antenna far-field and/or may support large link budgets. Radio signals may (e.g., thereby) be received by passive receivers over significant distances. The terms passive (e.g., and/or semi-passive) receiver and Ultra Low Power (ULP) receiver may be used interchangeably.

A device may (e.g., in a legacy communication system) perform a mobility procedure, for example, based on (e.g., only) the quality of a data communication link. A device (e.g., in a ULP system) may take into account the data communication link quality and at least one of the ULP interface quality and/or overall energy efficiency for a mobility procedure. ULP cell factors (e.g., specific factors) and/or ULP cell-Uu cell association may be implemented in a ULP network system.

A ULP interface may work independently and/or may have less (e.g., smaller) coverage than a Uu cell. One or more ULP (e.g., small) cells may be deployed within Uu coverage. Idle mode mobility procedures may support ULP systems, for example, so that devices may (e.g., efficiently) obtain ULP service. System energy efficiency (e.g., overall system energy efficiency) may be improved, for example, while devices may (e.g., still) maintain (e.g., good) communication links over a Uu interface.

As described herein, idle mode procedures in ULP idle mode, ULP cell reselection, and/or Uu cell selection (e.g., Uu idle mode state transition) may be enabled and/or performed. As described herein, idle mode procedures in Uu idle mode and/or ULP cell selection (e.g., ULP idle mode state transition) may be enabled and/or performed. As described herein, a ULP receiver capability may be indicated to the network, for example, so that the network may configure ULP configuration (e.g., only) towards users (e.g., WTRUs) that may be capable of ULP reception (e.g., and have corresponding subscriptions).

A serving Uu cell may be a Uu cell that is associated with a current serving ULP cell. A Uu cell may provide configuration information associated with the serving ULP cell and/or a data communication link for user data traffic and signaling (e.g., RRC signaling) to the WTRU camped on the serving ULP cell. One or more ULP cells may be associated with a Uu cell. A serving ULP cell may serve a ULP interface for a WTRU. A Uu cell may serve Uu, which may offer data communication and/or RRC signaling (e.g., including paging and system information). A Uu reference signal (UuRS) may be equivalent to a common RS (CRS) of a (e.g., regular) cell. For example, a UuRS may be equivalent to the synchronization signal block (SSB) of a (e.g., regular) NR cell.

An architecture for ULP may be provided. A ULP network may comprise one or more cells, such as a ULP cell, a Uu cell, a ULP cell type1, a ULP cell type2, a ULP cell type3, a ULP cell type4, a combination thereof, and/or the like. A ULP cell may provide a ULP interface for downlink signaling with ultra-low energy consumption, which may provide paging and system information (e.g., ULP SI). A ULP reference signal (ULPRS) may be transmitted by a ULP cell, for example, so that a WTRU may measure the reference signal to estimate the quality of a ULP interface. A ULP network may include (e.g., comprise) one or more of the following cells: a ULP cell and/or a Uu cell. A ULP cell may provide a ULP interface, which may enable energy efficient data communication (e.g., with limited bandwidth). A ULP interface may provide ULP-specific system information (SI) and/or a paging indication towards WTRUs. The ULP specific SI may provide associated Uu cell information. The associated Uu cell may provide a WTRU with data communication (e.g., after the ULP paging indication). A ULP cell may be associated with a (e.g., regular) cell serving a Uu radio interface. An associated cell (e.g., regular cell) may be referred to as a Uu cell. A Uu cell may signal one or more associated ULP cells, for example, via system information.

FIG. 2 illustrates examples of ULP cell types. As shown in FIG. 2, a ULP network may have multiple (e.g., four example) types of ULP cells. A Uu cell and associated ULP cell(s) may operate, for example, in-band, at low or high frequencies, and/or out-of-band. For example, a Uu cell may operate at high frequencies while associated ULP cell(s) may operate at low frequencies. In some examples, a Uu cell and associated ULP cell(s) may operate out-of-band. For example, a Uu cell may operate at low frequencies and associated ULP cell(s) may operate at high frequencies.

As shown in FIG. 2 (e.g., ULP cell type1), a Uu-ULP Hybrid Cell may (e.g., simultaneously) serve Uu and ULP interfaces. In some examples, Uu and ULP interfaces may have the same geographical coverage. In some examples, a reference signal may comprise a UuRS (e.g., equivalent to SSB). In some examples, Uu and/or ULP coverage evaluation may be based on a ULPRS.

As shown in FIG. 2 (e.g., ULP cell type 2), a Uu-ULP Hybrid Cell may (e.g., simultaneously) serve Uu and ULP interfaces. A ULP interface may have smaller geographical coverage than Uu coverage. In some examples, Uu coverage evaluation may be based on a UuRS (e.g., equivalent to SSB) while ULP coverage evaluation may be based on a ULPRS. In some examples, a ULP cell (e.g., a type 2 cell) may provide a ULPRS and/or a UuRS (e.g., SSB).

As shown in FIG. 2 (e.g., ULP cell type 3), a small ULP cell may serve a ULP interface for paging and/or may serve SI for a ULP cell (ULP-SI). A small ULP cell may be associated with a Uu cell. A ULP small cell may be collocated within a (e.g., single) Uu cell's coverage. In some examples, ULP coverage evaluation may be based on a ULPRS.

As shown in FIG. 2 (e.g., ULP cell type 4), a small ULP cell may serve a ULP interface for paging and/or may serve SI for a ULP cell (ULP-SI). A Small ULP cell may be associated with a Uu cell. A ULP small cell may be located at the edge of coverage for more than one Uu cell.

A ULP network may be deployed, for example, with one or more (e.g., a combination) ULP cell types (e.g., one or more examples shown in FIG. 2).

A WTRU may support RRC activity levels (e.g., RRC states). A WTRU may support Uu RRC states (e.g., RRC IDLE, RRC INACTIVE, RRC CONNECTED states, and the like). A WTRU may support an RRC state for ULP support in IDLE mode (e.g., ULP RRC IDLE state). A WTRU may have multiple (e.g., two) states in idle mode in a ULP network (e.g., as shown by example in FIG. 3).

Figure 3:
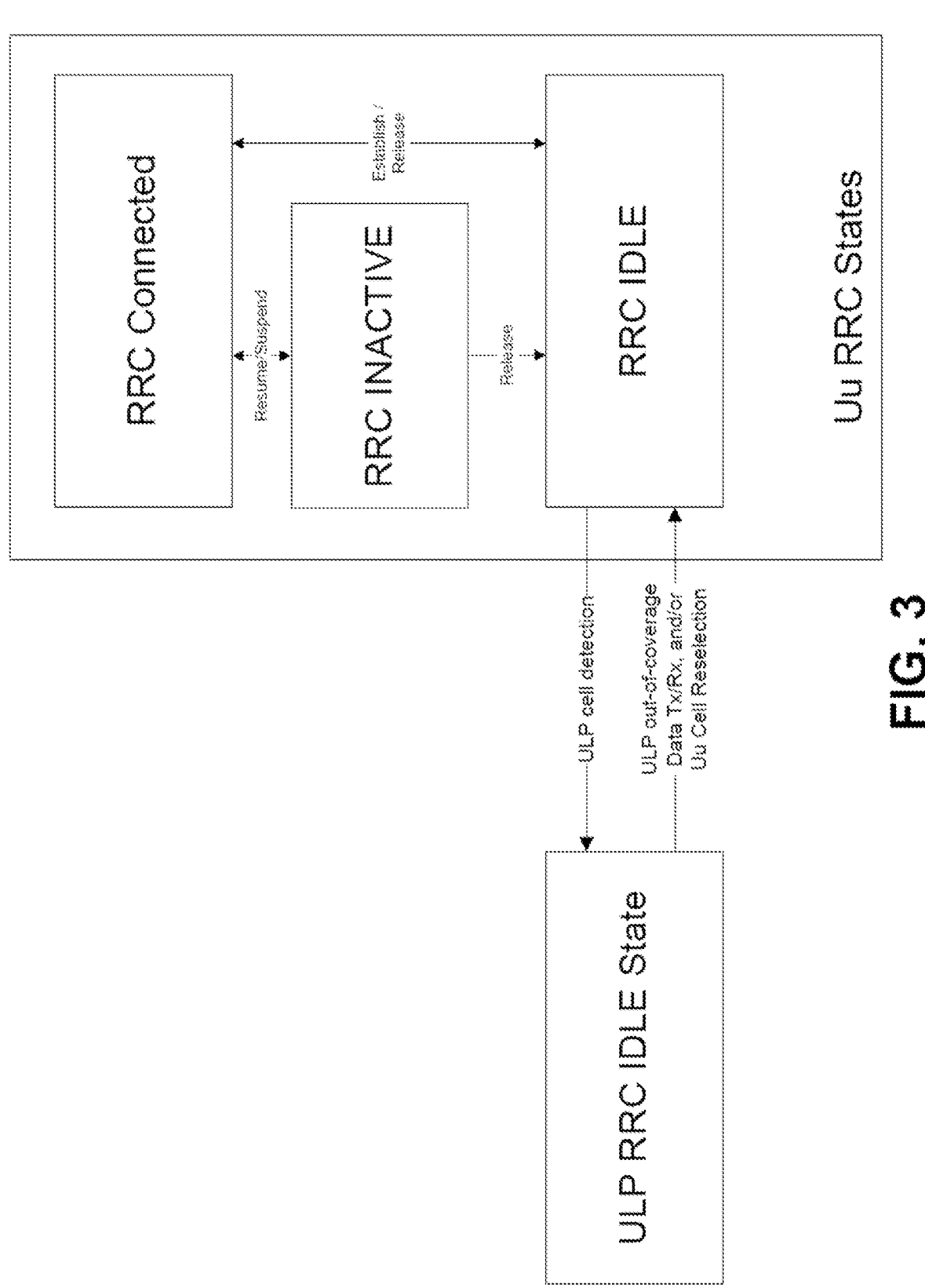
FIG. 3 illustrates an example of WTRU one or more states in a ultra-lower power (ULP) network.

FIG. 3 illustrates an example of WTRU states in ULP networks. As shown in FIG. 3, a ULP cell may be supplementary to one or more Uu cells (e.g., a ULP cell may be a dependent cell or may not stand on its own). A ULP cell may support (e.g., enable) ultra-low power operations, for example, in IDLE mode. A WTRU may enter a ULP RRC IDLE state (e.g., only) from an RRC-IDLE state. A WTRU may move to RRC-INACTIVE or RRC-CONNECTED states (e.g., to receive services associated with RRC-INACTIVE or RRC-CONNECTED states), for example, by (e.g., first) transitioning to RRC-IDLE from the ULP RRC IDLE state.

Idle mode may include one or more states (e.g., two states). The idle mode state may include, for example, Uu idle mode and/or ULP idle mode. In an example, Uu idle mode may be referred to as a regular idle mode. A WTRU in Uu idle mode may be camped on a Uu cell (e.g., a regular cell). The WTRU may have access to the Uu interface, which may support (e.g., provide or offer) high throughput (e.g., relatively high throughput) data communication and/or signaling (e.g., via RRC signaling). A WTRU in ULP idle mode may be camped on a ULP cell. The WTRU may receive (e.g., in a power efficient manner) ULP paging and/or ULP-specific system information.

Battery status awareness may be provided. A WTRU may monitor a battery status (e.g., a WTRU may have battery status awareness). A WTRU may determine whether to move into a ULP idle mode, for example, based on battery status. A WTRU may refrain from moving (e.g., not move) into ULP idle mode (e.g., may remain in Uu idle mode), for example, if the battery of the WTRU is charged at a certain (e.g., threshold) amount (e.g., X %). A WTRU may (e.g., attempt to) move into ULP idle mode to reduce battery consumption, for example, if the battery level is less than or equal to a certain (e.g., threshold) amount (e.g., X %).

Transitions may be performed, where state transitions may be an example A WTRU may transition from Uu idle mode to ULP idle mode. A WTRU may perform ULP cell selection, e.g., to be camped on a suitable ULP cell. A WTRU may acquire ULP-specific system information during ULP cell selection (e.g., when the WTRU is camped on a ULP cell).

A WTRU may transition from ULP idle mode to Uu idle mode. A WTRU may perform Uu cell selection, e.g., to be camped on a suitable Uu cell. A WTRU may know (e.g., have information about) a suitable Uu cell, for example, with or without ranking Uu cells across the current serving Uu cell and the neighboring Uu cells (e.g., for ULP cell types1 and 2). In some examples, the Uu cell center of ULP cell types 1 and 2 may be (e.g., may always be) collocated with the cell center of the serving ULP cell. A WTRU may refrain from (e.g., not perform or not need to perform) fully re-synchronizing the Uu cell, for example, if the coarse timing of the Uu cell is known. A WTRU may refrain from acquiring (e.g., not acquire or not need to acquire) SI from the Uu cell, for example, if the WTRU acquired the SI before moving into the ULP idle mode. A WTRU may (e.g., in the cases of ULP cell types 1 and 2) access (e.g., immediately access) the Uu cell (e.g., without performing Uu cell selection) for the state transition.

Examples are provided herein for multiple ULP cell types (e.g., addressing multiple scenarios described herein). In some examples, a WTRU may perform a different mobility procedure per WTRU idle mode state (e.g., Uu idle mode mobility procedure and ULP idle mode mobility procedure, respectively).

Mobility procedures may be implemented in ULP idle mode. Examples are provided that describe how a WTRU may perform one or more mobility features in ULP idle mode.

A WTRU may be camped on a ULP cell. A WTRU may determine whether the WTRU has an acceptable radio link with a serving ULP cell (e.g., whether the quality of the serving ULP cell is above a threshold). A WTRU may monitor the quality of the current serving ULP cell and/or the quality of one or more neighboring ULP cells, for example, so that the WTRU may reselect to another ULP cell (e.g., if another ULP cell becomes a better ranked ULP cell). A WTRU may monitor for and/or detect an out-of-ULP service event (e.g., based on determining that signal qualities associated with respective RS(s) associated with the serving ULP cell and neighboring ULP cells are below a threshold, or based on a failure to detect a RS associated with a (e.g., any) ULP cell having a signal quality above a threshold), for example, so that the WTRU may initiate Uu cell selection to be camped on a Uu cell (e.g., if/when a suitable ULP cell may not be available for the WTRU). A WTRU (e.g., in ULP idle mode) may (e.g., also) monitor the quality of the serving Uu cell and/or the neighboring Uu cells, for example, so that the WTRU may reselect to another Uu cell (e.g., if the other Uu cell becomes better ranked Uu cell). WTRU monitoring and detection (e.g., as described herein) may be used to support mobility procedures in ULP idle mode.

Figure 4A:
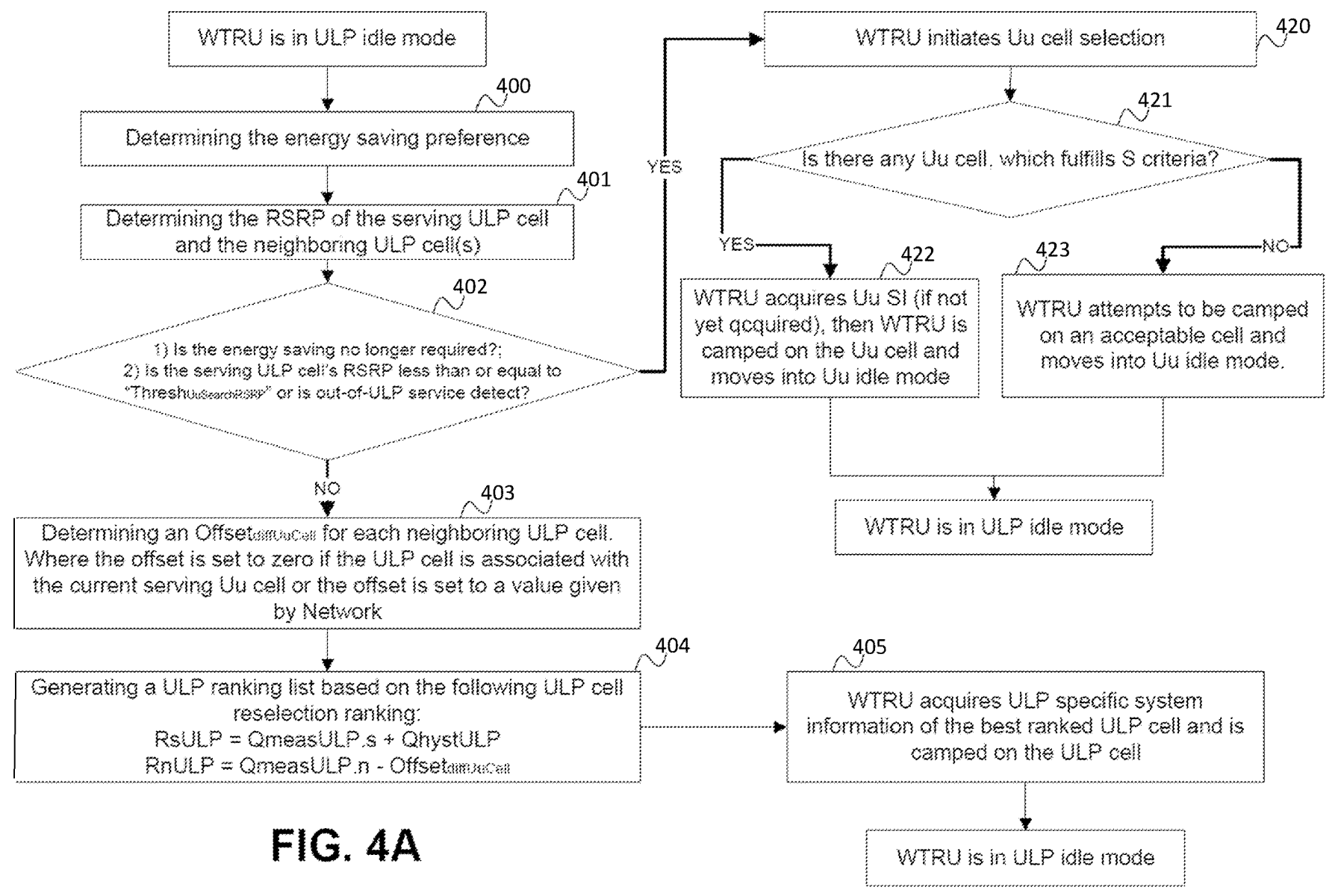
Figure 4B:
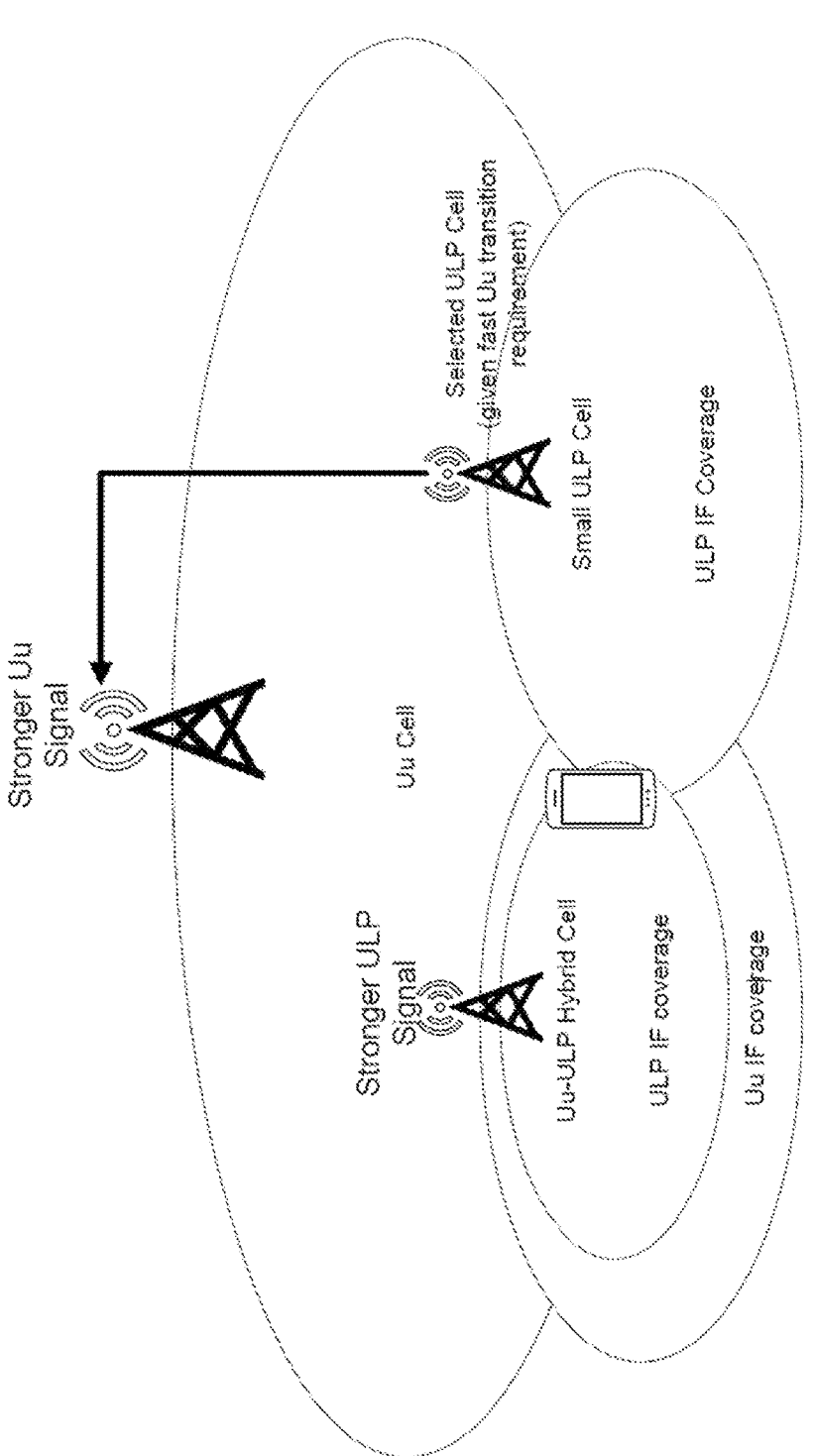
FIG. 4B illustrates an example of one or more ULP idle mode mobility procedures.

Mobility may be implemented with a power consumption constraint. FIG. 4A illustrates an example associated with ULP idle mode, where a WTRU may perform one or more of the illustrated features. For example, FIGS. 4A and 4B may show an example of how a WTRU may perform mobility feature(s) in ULP idle mode.

As shown in FIG. 4A, at 400, a WTRU may determine an energy saving preference, for example, based on one or more of a battery status, a device type, an active service type, an active application type, and/or the like. A WTRU may determine that energy saving is not being implemented (e.g., may no longer be required), for example, if/when a battery level becomes greater than or equal to a threshold. A WTRU may determine that energy saving is not being implemented, for example, if/when a device type is changed to a new device type that does not require energy saving (e.g., if/when the device is connected to a power adaptor). A WTRU may determine that energy saving is not being implemented, for example, if/when the active service prioritizes data communication capacity over an energy saving gain. A WTRU may determine that energy saving is not being implemented, for example, if/when the active application prioritizes data communication capacity over the energy saving gain.

As shown in FIG. 4A at 401, a WTRU may determine the quality (e.g., RSRP) of the serving ULP cell and/or the neighboring ULP cells, for example, for ULP cell reselection and/or for detection of out-of-ULP service. The WTRU may detect out-of-ULP service, for example, if the determined qualities (e.g., RSRPs) of the ULP cell and the neighboring ULP cells are (e.g., all) below a detectability threshold. The WTRU may initiate evaluation (e.g., determine) the quality (e.g., RSRP) of the neighboring ULP cells, for example, based on a measurement of the serving ULP cell. For example, the WTRU may determine the quality (e.g., RSRP of the neighboring ULP cells (e.g., for ULP cell reselection if the measurement of the serving ULP cell is below a threshold (e.g., ULP cell reselection threshold).

As shown in FIG. 4A at 402, the WTRU may determine (e.g., check) one or more items. A WTRU may determine whether the WTRU prefers (e.g., still prefers) energy saving (e.g., whether energy saving is still being used, and/or whether energy saving is still required). A WTRU may initiate Uu cell selection (e.g., proceed to 420 in FIG. 4A), for example, if the energy saving is no longer used (e.g., required) or desired (e.g., battery level becomes greater than a threshold). A WTRU may determine whether the serving and/or neighboring ULP cells are or become weaker than a threshold (e.g., Thresh UuSearchRSRP) for a certain (e.g., selected, specified, or configured) amount of time (e.g., given by network or hardcoded). A WTRU may initiate Uu cell selection (e.g., proceed to 420 in FIG. 4A), for example, if the ULP cells are or become weaker than the threshold (e.g., Thresh UuSearchRSRP). A WTRU may proceed to 404 in FIG. 4A, for example, if the energy saving is desired or used (e.g., required) and the ULP cell(s) is/are above the threshold (e.g., Thresh UuSearchRSRP).

As shown in FIG. 4A at 403, the WTRU may determine an offset (e.g., OffsetdifferentUuCell), for example, based on the Uu-ULP cell association for a (e.g., each) neighboring ULP cell. An offset may be determined, for example, for a (e.g., each) ULP cell. The WTRU may determine a Uu offset and a ULP offset, for example, for a (e.g., each) ULP cell. An offset may be set to zero or may not be determined/applied, for example, if a neighboring ULP cell is associated with a current serving Uu cell. An offset may be set to a value (e.g., given by a network), for example, if the neighboring ULP cell is associated with a different Uu cell than the current serving Uu cell. An offset may be introduced (e.g., used) to prioritize ULP cells associated with the current serving Uu cell, for example, so that a WTRU may avoid system information acquisition from a different (e.g., new) Uu cell, which may be a (e.g., very) energy consuming procedure during ULP cell reselection. The one or more offsets may be provided to the WTRU for (e.g., each of the) ULP cell(s) that are associated with the serving (e.g., last-known serving) Uu cell and neighboring Uu cells as part of system information (e.g., SIB3, SIB4, and/or SIB5). Information about the offsets may be provided as part of a message (e.g., an RRCRelease message).

As shown in FIG. 4A at 404, the WTRU may generate a ULP cell ranking (e.g., as described herein), for example, based on measured RSRP value(s) of ULP cell(s) associated with the serving Uu cell, measured RSRP value(s) of neighbor ULP cell(s) and offset(s) (e.g., "OffsetdifferentUuCell") associated with the (e.g., each) neighboring ULP cell. The WTRU may determine signal qualities associated with the ULP cells based on the measured RSRP values of the relevant ULP cells and the offset for the (e.g., each) neighboring ULP cells. The WTRU may select a ULP cell (e.g., from the ULP cell ranking), for example based on the determined signal qualities (e.g., from the measured RSRP values of the relevant ULP cells and the offset for each neighboring ULP cell). The selected ULP cell may be the ULP cell (e.g., from the ULP cell ranking) with the highest signal quality.

As shown in FIG. 4A at 405, the WTRU may acquire ULP SI (e.g., ULP configuration information) from the selected ULP cell (e.g., the best ranked ULP cell). The ULP configuration information may include ULP-specific system information. The ULP configuration information may include information that may assist in paging message reception and/or ULP cell (re-)selection. The WTRU may camp on the selected ULP cell (e.g., the WTRU may use and/or receive signals from the ULP cell according to the ULP SI or connect to the ULP cell using the ULP SI). The WTRU may move into ULP idle mode (e.g., if WTRU has not yet moved into the ULP idle mode).

As shown in FIG. 4A at 420, the WTRU may initiate Uu cell selection (e.g., reselection).

As shown in FIG. 4A at 421, the WTRU may determine whether (e.g., check if) a suitable Uu cell is found (e.g., a Uu cell that fulfills a condition). The WTRU may proceed to 422 in FIG. 4A, for example, if a suitable Uu cell is found. The WTRU may proceed to 423 in FIG. 4A, for example, if a suitable Uu cell is not found.

As shown in FIG. 4A at 422, the WTRU may acquire system information (e.g., Uu configuration information) from the selected (e.g., new) Uu cell. The WTRU may camp on the Uu cell (e.g., connected to the Uu cell using the Uu configuration information). The WTRU may move into Uu idle mode.

The WTRU may perform a cell search. As shown in FIG. 4A at 432, the WTRU may (e.g., attempt to) camp on an acceptable cell (e.g., cells that satisfy criteria, for example, such as S Criteria, as described herein). In examples, an acceptable cell may be used for limited capabilities (e.g., for emergency calls). In examples, a suitable cell (e.g., in contrast to an acceptable cell) may be used to perform functions in addition to limited capabilities (e.g., more functions than emergency calls). The WTRU may move into Uu idle mode. The WTRU may perform a public land mobile network (PLMN) search, for example, to be camped on a suitable Uu cell.

A WTRU may perform ULP cell ranking. A WTRU may perform ULP cell reselection across the ULP cells (e.g., based on one or more criteria). For example, a WTRU may perform ULP cell reselection by ranking ULP cells based on RSRP values of a ULPRS transmitted by the current serving ULP cell (e.g., rank indicated by RsULP) and/or one or more neighboring ULP cells (e.g., rank indicated by RnULP). A ranking of ULP cells based on RSRP values of a ULPRS transmitted by the current serving ULP cell may be provided, for example, in accordance with Eq. (1):

$$RsULP = QmeasULP.s + QhystULP \qquad \text{Eq. (1)}$$

A ranking of ULP cells based on RSRP values of a ULPRS transmitted by one or more neighboring ULP cell may be provided, for example, in accordance with Eq. (2):

$$RnULP = QmeasULP.n \qquad \text{Eq. (2)}$$

Example descriptions of variables or parameters in Equations (1) and (2) are provided by Table 1:

TABLE 1

| Variable/Parameter | Description |
|---|---|
| QmeasULP.s | measured RSRP of the current serving ULP cell's ULPRS |
| QmeasULP.n | measured RSRP of the neighboring ULP cell's ULPRS |
| QhystULP | hysteresis value (e.g., to prioritize the current serving ULP cell); the hysteresis value may be a network configurable parameter. |

Mobility for enabling fast fallback to Uu IDLE state may be implemented, for example, based on one or more constraints. A WTRU may (e.g., determine to) reduce the transition time between the ULP and Uu RRC IDLE states (e.g., for out-of-band deployment of ULP cells), which may (e.g., subsequently) reduce the WTRU's overall transition time to the RRC CONNECTED state. The WTRU may (e.g., simultaneously) consider the link quality of Uu and ULP cells during a cell reselection procedure. A WTRU may benefit from ULP cell deployment and/or may reduce the power consumption penalty associated with Uu cell measurements, for example, by limiting Uu cell(s) measurements to scenarios where the WTRU has low mobility and/or where the WTRU is at the cell edge. For example, a WTRU may determine received ULP reference signal strength (e.g., RSRP of ULPRS) below a threshold (e.g., $Thresh_{UuAnchorRSRP}$), which may be configured by the network.

Cell-ranking criterion (e.g., $R_s$ for a serving cell and $R_n$ for neighboring cells) may be used to account for Uu cell association, for example, in accordance with Equations (3) and (4):

$$R_s = Q_{meas,s} + \alpha_{UuAnchor} Q_{UuRSmeas,s} + Q_{hyst} \qquad \text{Eq. (3)}$$

$$R_n = Q_{meas,n} + \alpha_{UuAnchor} Q_{UuRSmeas,n} \qquad \text{Eq. (4)}$$

Example descriptions of variables or parameters in Equations (3) and (4) are provided by Table 2:

TABLE 2

| | |
|---|---|
| $Q_{UuRSmeas,s}$ | RSRP of UuRS sent from the Uu cell associated with the serving ULP cell, e.g., representing the measurement quantity used in cell reselections. |
| $Q_{UuRSmeas,n}$ | RSRP of UuRS sent from the Uu cell associated with a neighboring ULP cell, e.g., representing the measurement quantity used in cell reselections. |
| $\alpha_{UuAnchor}$ | Scaling factor to balance the link quality of a potentially selected ULP cell and the potential transition time from ULP RRC IDLE to Uu RRC IDLE and Uu RRC Connected state. |

In some examples, a WTRU may be (pre)configured with or may receive (e.g., via SI) one or more of the following cell (re-)selection and IDLE states transition parameters/configuration information: cell quality hysteresis (e.g., $Q_{hyst}$), for example, for ranking criteria; a scaling factor (e.g., $\alpha_{UuAnchor}$), for example, for balancing link quality of the ULP cell with associated Uu Cell (e.g., to enable fast fallback to Uu IDLE state); one or more ULPRS measurement thresholds, for example, to initiate cell reselection or IDLE states transition; and/or UuRS measurement configuration information and/or triggering thresholds.

A WTRU may operate in the ULP RRC IDLE state. The WTRU may monitor the RSRP of ULPRS of serving/neighboring ULP cells. The WTRU may follow a UuRS measurements configuration, for example, if (e.g., on a condition that) the WTRU determines that the WTRU is at the ULP cell edge and/or has low mobility. The WTRU may (e.g., otherwise) deprioritize (e.g., decide to) deprioritize requirements on IDLE-to-CONNECTED states transition delay or transition to the Uu IDLE state, for example, to maintain the requirements. The WTRU may determine the link quality of the serving cells, neighboring ULP cells, and associated Uu cells. The WTRU may generate a cell ranking list, for example, according to the criteria defined in Equations (3) and (4), for example, by scaling the associated Uu cell with the received/preconfigured scaling factor (e.g., $\alpha_{UuAnchor}$) and selecting the highest ranked ULP cell. The WTRU may camp on the ULP cell, for example, if (e.g., on a condition that) the selected ULP cell satisfies the suitability criteria (S criteria).

Uu cell measurement may be relaxed. As described herein, a WTRU may (e.g., determine to) limit the Uu cell(s) measurements, for example, to one or more scenarios, such as if/when the WTRU is at the cell edge and/or the WTRU has low mobility. Limiting the Uu cell(s) measurements to one or more scenarios may allow the WTRU to benefit from the ULP cell deployment and reduce the power consumption penalty associated with Uu cell measurements. The WTRU may (e.g., additionally and/or alternatively) consider Uu cell measurement relaxation, for example, based (e.g., depending) on the WTRU type, quality of service (QOS) requirements, and/or mobility state, which may be determined, for example, based on one or more (e.g., a combination) of the following criteria: an observed rate of change in received ULP reference signal strength (e.g., RSRP of ULPRS) falling below a first threshold; an observed rate of ULP cell reselection falling below a second threshold; and/or an observed rate of state transitions between ULP and Uu RRC IDLE states falling below a third threshold. The first, second, and third thresholds may be (pre)configured, for example, by the network. Threshold may be conveyed to the WTRU, for example, via system information.

A WTRU may relax Uu cell measurements, for example, by reducing the density of the UuRS measurements. The lower Uu cell measurements' density may be complemented, for example, by mapping information between ULPRS and UuRS characteristics. The WTRU may consider (e.g., use) interpolation techniques, for example, where the UuRS measurements may be used as reference points with higher weights and mapped ULPRS measurements may be used as guiding points with lower weights. The mapping between ULPRS and UuRS may consider, for example, one or more of the following: a carrier frequency/band of the operation, a transmit signal power, a number of allocated resources, a number of transmit antennas/beamforming, etc.

The WTRU may (e.g., then) utilize (e.g., the same) cell-ranking criterion $R_s$ for serving cell and $R_n$ for neighboring cells, for example, as provided by Equations (3) and (4). The UuRS measurement quantities $Q_{UuRSmeas,s}$ and $Q_{UuRSmeas,n}$ may represent the relaxed measurements (e.g., directly or replaced by the interpolated quantities that indicate the approximate RSRP of the UuRS). The WTRU may (e.g., alternatively) utilize (e.g., generic) cell-ranking criteria $R_s$ for serving cell and $R_n$ for neighboring cells, which may be provided, for example, in accordance with Equations (5) and (6):

$$R_s = Q_{meas,s} + Qoffset_{UuAnchorRSRP}(Q_{UuRSmeas,s}) + Q_{hyst} \qquad \text{Eq. (5)}$$

$$R_n = Q_{meas,n} + Qoffset_{UuAnchorRSRP}(Q_{UuRSmeas,n}) \qquad \text{Eq. (6)}$$

With reference to Equations (5) and (6), $Qoffset_{UuAnchorRSRP}$ may be a function that generates an offset, which may be specific to the Uu cell associated with the serving/neighboring ULP cell. $Qoffset_{UuAnchorRSRP}$ may be determined, for example, based on the measured RSRP of UuRS, an interpolated link quality of the Uu cell, and/or as desired (e.g., selected or configured) by the WTRU or configured by a network scaling factor. In example, the $Qoffset_{UuAnchorRSRP}$ function may be the linear function considered in Equations (3) and (4) with the scaling factor $\alpha_{UuAnchor}$. In (e.g., additional and/or alternative) examples, the $Qoffset_{UuAnchorRSRP}$ may be a step function, which may be configured with a scaling factor (e.g., similar to $\alpha_{UuAnchor}$) and a measurement resolution. This example and other examples (e.g., as described herein) are open-ended and do not preclude the use of any other function.

Figure 5:
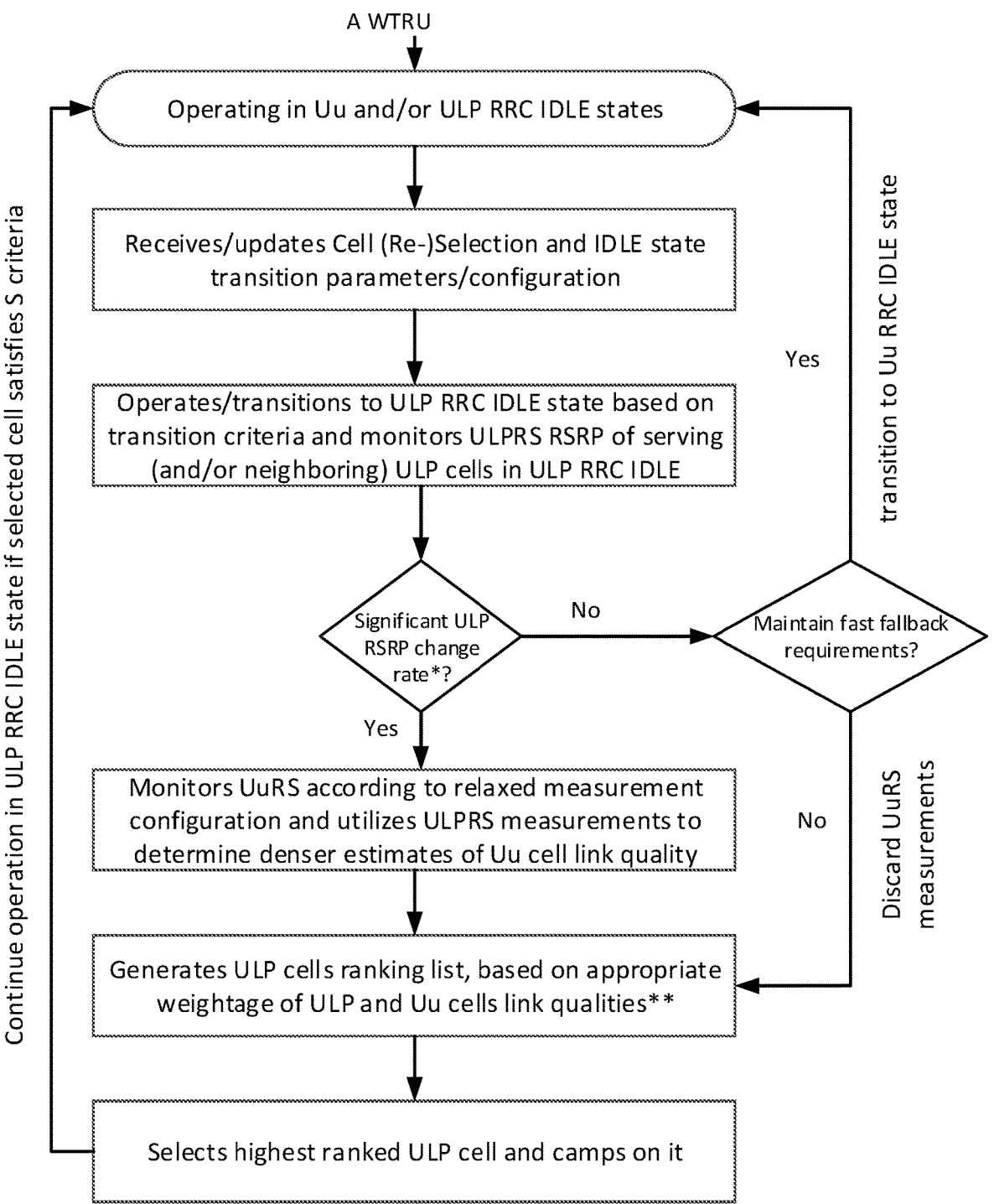
FIG. 5 illustrates a flow chart of an example an ULP cell reselection procedure.

FIG. 5 illustrates a flow chart of an example ULP cell reselection procedure. As shown in FIG. 5, a WTRU may be (pre)configured with, receive (e.g., via SI), and/or determine, for example, one or more of the following cell (re-)selection and IDLE states transition parameters/configuration information: cell quality hysteresis ($Q_{hyst}$), for example, for ranking criteria; ULPRS and UuRS measurement mapping information (e.g., carrier frequency/band of operation, transmit signal power, number of allocated resources, number of transmit antennas/beamforming, and/or the like); mapping function(s) between measured RSRP of UuRS and/or interpolated link quality of the Uu cell and serving/neighboring cell quality offsets (e.g., $Qoffset_{UuAnchorRSRP,s}$ and $Qoffset_{UuAnchorRSRP,n}$); and/or measurement thresholds and configuration information used for IDLE states transition and UuRS measurement relaxation.

The WTRU may (e.g., then) operate in the ULP RRC IDLE state. The WTRU may monitor the RSRP of a ULPRS of serving/neighboring ULP cells. The WTRU may follow UuRS relaxed measurements configuration information, for example, if (e.g., on a condition that) the WTRU determines that the WTRU is at the ULP cell edge and/or has low mobility. The WTRU may (e.g., otherwise) deprioritize (e.g., determine to deprioritize) requirements on an IDLE-to-CONNECTED states transition delay and/or transition to a Uu IDLE state (e.g., to maintain the requirement). The WTRU may utilize the UuRS and/or ULPRS measurements, and/or received/configured measurement mapping information, for example, to interpolate RSRP values (e.g., that may indicate the link quality of Uu cells associated with serving and neighboring ULP cells). The WTRU may determine the serving ULP cell and neighboring ULP cells quality offsets, for example, based on RSRP values (e.g., interpolated RSRP values) and/or received/(pre)configured mapping function(s). The WTRU may generate a cell ranking list, for example, according to the criteria defined in Equations (5) and (6). The WTRU may select the highest ranked ULP cell (e.g., ULP cell with the highest signal quality). The WTRU may camp on the ULP cell, for example, if (e.g., on a condition that) the selected ULP cell satisfies the S criteria.

As indicated in FIG. 5 at 510, the WTRU may (e.g., additionally and/or alternatively) determine to limit UuRS measurements (e.g., to if/when the WTRU is at the cell edge). As indicated in FIG. 5 at 520, Uu cells link qualities may be considered in ULP cell ranking criteria, for example, if (e.g., when) representative Uu cells link qualities values (e.g., based on direct measurements or a combination of direct measurements and estimates based on ULPRS measurements) are available.

Figure 6:
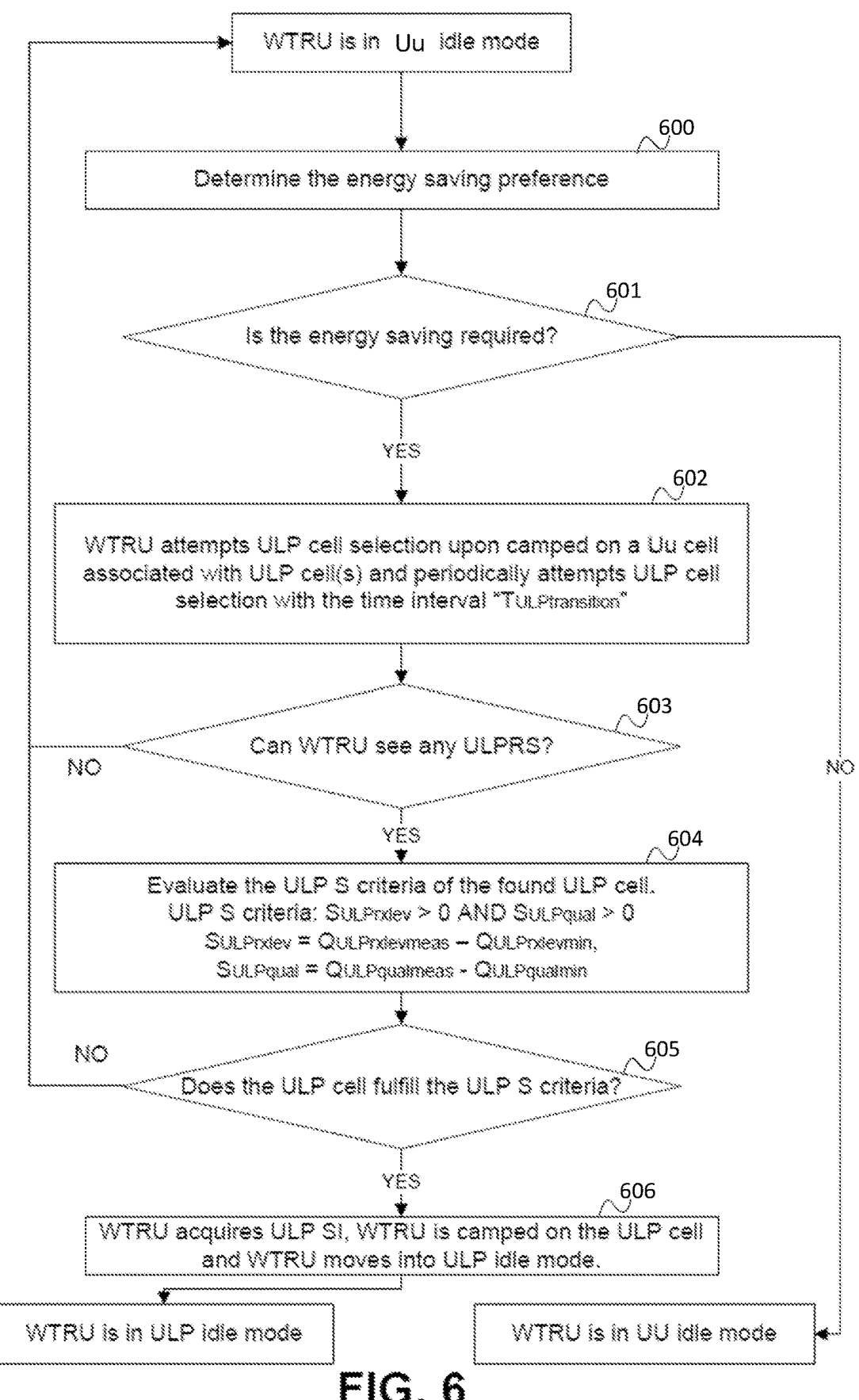
FIG. 6 illustrates an example of a Uu idle mode mobility procedure.

Mobility procedures may be implemented in Uu idle mode. FIG. 6 illustrates an example of a Uu idle mode mobility procedure. FIG. 6 shows how a WTRU may perform mobility procedures in Uu idle mode. As shown in FIG. 6, at 600, a WTRU may determine an energy saving preference, for example, based on battery status, device type, active service type, and/or active application type. A WTRU may determine that energy saving is no longer required, for example, if (e.g., when) a battery level becomes greater than or equal to a threshold. A WTRU may determine that energy saving is no longer required, for example, if (e.g., when) a device type is changed and the selected (e.g., new) device type does not use (e.g., require) energy saving, if (e.g., when) the device is connected to a power adaptor, if (e.g., when) the active service prioritizes data communication capacity over the energy saving gain, and/or if (e.g., when) the active application prioritizes data communication capacity over the energy saving gain.

As shown in FIG. 6 at 601, the WTRU may determine (e.g., check) the energy saving preference. The WTRU may stay in the Uu idle mode and/or perform one or more idle mode mobility procedures (e.g., as defined herein), for example, if the energy saving preference is set to a setting associated with not using energy savings (e.g., the energy saving preference is set to "energy saving is no longer required"). The WTRU may (e.g., otherwise) go to 602 in FIG. 6, for example, if the energy savings preference is set to a setting associated with using energy savings.

As shown in FIG. 6 at 602, the WTRU may (e.g., attempt to) perform ULP cell selection, for example, if energy saving is used (e.g., required) and/or if the current serving Uu cell has (e.g., any) associated ULP cell(s). The WTRU may (e.g., attempt to) perform the ULP cell selection (e.g., with the time interval $T_{ULPtransition}$), for example, if the conditions are met. The time interval $T_{ULPtransition}$ may be scaled, for example, based on the number of ULP cells associated with the serving Uu cell, the WTRU's mobility state, and/or the WTRU's battery level. The scaling factor may be decreased, for example, inversely-proportional to the number of ULP cells associated with the serving Uu cell. The scaling factor may be decreased, for example, if (e.g., when) the WTRU is moving rather than stationary. The scaling factor may be decreased, for example, proportional to the battery level.

As shown in FIG. 6 at 603, the WTRU may determine whether (e.g., check if) the WTRU may see (e.g., is able to see) a (e.g., any) ULPRS. The WTRU may proceed to 604 in FIG. 6, for example, if the WTRU sees one or more ULPRSs. The WTRU may (e.g., otherwise) go back to 602 in FIG. 6.

As shown in FIG. 6 at 604, the WTRU may verify that the found ULP cell fulfills the ULP S criteria (e.g., as described herein). The WTRU may (e.g., for verification) determine the measured results of ULP cell received signal level ($Q_{ULPrxlevmeas}$) and/or ULP cell quality ($Q_{ULPqualmeas}$).

As shown in FIG. 6 at 605, the WTRU may determine whether a suitable ULP cell (e.g., ULP cell that fulfills ULP S criteria) is found. The WTRU may proceed to 606 in FIG. 6, for example, if a suitable ULP is found. The WTRU may (e.g., otherwise) go back to 602 in FIG. 6.

As shown in FIG. 6 at 606, the WTRU may acquire system information from the serving ULP candidate cell. The WTRU may be camped on the ULP cell. The WTRU may move into ULP idle mode.

ULP S criteria may be determined. The ULP cell selection criteria S may be fulfilled, for example, based on satisfaction of Inequality (Ineq.) (A) based on equations (7) and (8):

$$S_{ULPrxlev} > 0 \text{ AND } S_{ULPqual} > 0 \qquad \text{Ineq. (A)}$$

$$S_{ULPrxlev} = Q_{ULPrxlevmeas} - Q_{ULPrxlevmin} \qquad \text{Eq. (7)}$$

$$S_{ULPqual} = Q_{ULPqualmeas} - Q_{ULPqualmin} \qquad \text{Eq. (8)}$$

Example descriptions of parameters for ULP S criteria in Ineq. (A) and equations (7) and (8) are provided in Table 3:

TABLE 3

| Variable/Parameter | Description |
|---|---|
| $S_{ULPrxlev}$ | ULP Cell selection RX level value (dB) |
| $S_{ULPqual}$ | Cell selection quality value (dB) |
| $Q_{ULPrxlevmeas}$ | Measured cell RX level value (RSRP) of ULPRS |
| $Q_{ULPrxlevmin}$ | Minimum required RX level in the ULP cell (dBm) |
| $Q_{ULPqualmeas}$ | Measured cell quality value (RSRQ) of ULPRS |
| $Q_{ULPqualmin}$ | Minimum required quality level in the ULP cell (dB) |

Figure 7:
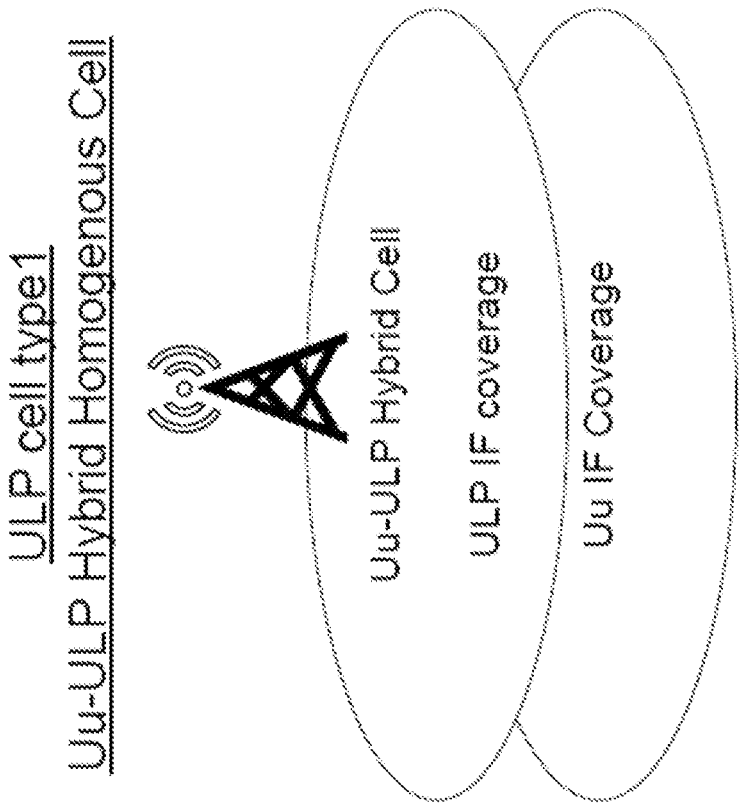
FIG. 7 illustrates an example of a ULP cell type1.

FIG. 7 illustrates an example of ULP cell type1. Examples of mobility scenarios are described with regard to ULP cell type1 shown in FIG. 7.

In some examples, cell reselection may occur between ULP cell type1 cells.

Figures 8, 9:
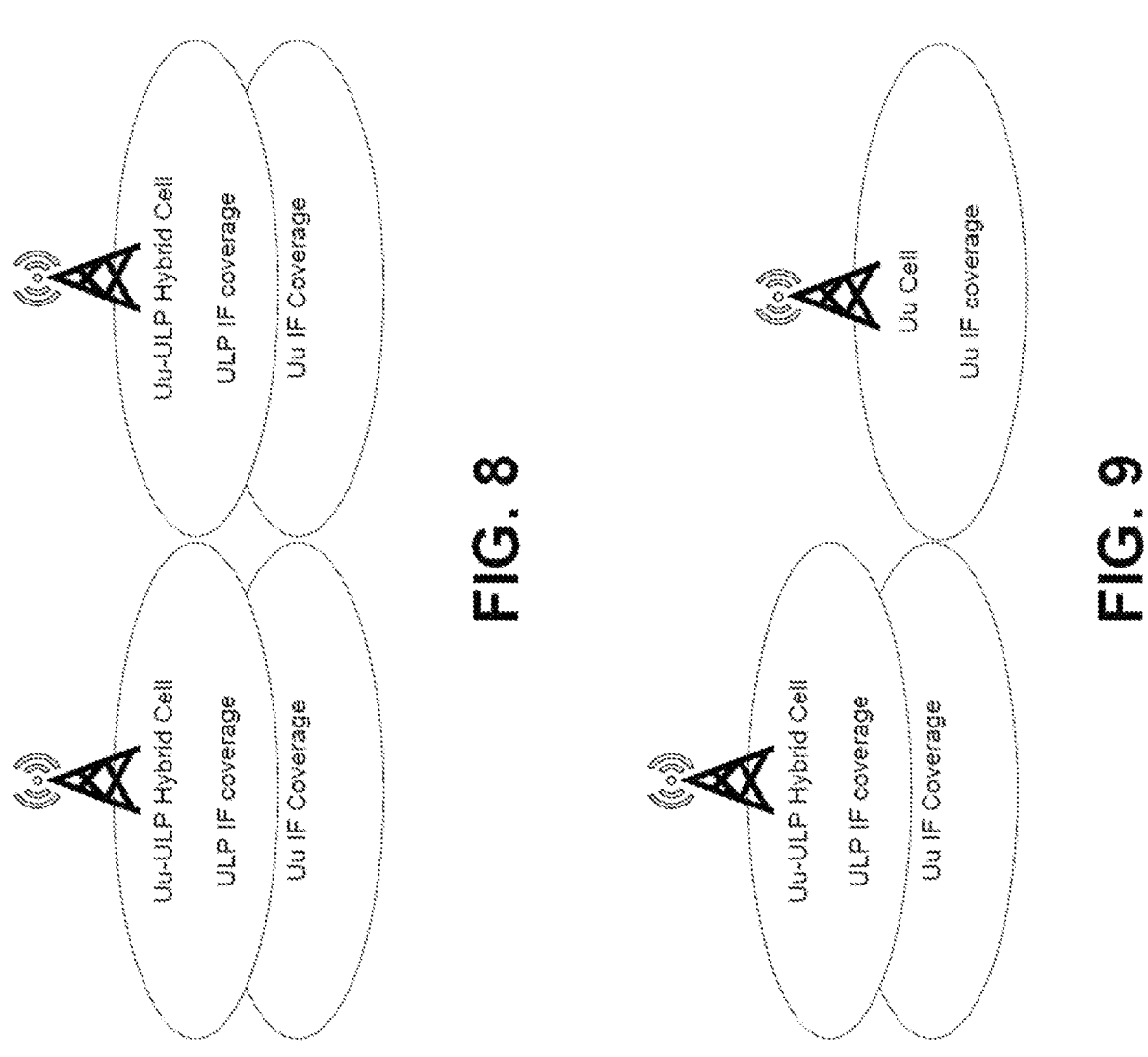
FIG. 8 shows an example of a mobility scenario involving cell reselection between one or more ULP cell type1 cells.
FIG. 9 illustrates an example of cell reselection based on leaving a ULP coverage.

FIG. 8 shows an example of a mobility scenario involving cell reselection between ULP cell type1 cells. FIG. 8 shows an example of cell reselection between Uu-ULP hybrid cells. In some examples (e.g., as shown in FIG. 8), a cell reselection procedure may be applied. A WTRU may generate a ULP cell ranking, for example, based on the RSRP of ULPRS(s). The WTRU may select a (e.g., the best) ranked ULP cell (e.g., based on a ULP cell-ranking criterion), for example, as a candidate ULP cell to be camped on after the cell reselection.

A ULP cell-ranking criterion may be applied, for example (e.g., in the example scenario shown in FIG. 8), if (e.g., when) there is (e.g., only) a constraint on a WTRU's power consumption. A cell-ranking criterion $R_s$ for a serving cell and a cell-ranking criterion $R_n$ for neighboring cells may be determined (e.g., calculated, specified, configured), respectively, for example, in accordance with Equations (9) and (10):

$$R_s = Q_{meas,s} + Q_{hyst} \qquad \text{Eq. (9)}$$

$$R_n = Q_{meas,n} \qquad \text{Eq. (10)}$$

Example descriptions of parameters/variables in equations (9) and (10) are provided in Table 4:

TABLE 4

| | |
|---|---|
| $Q_{meas,s}$ | RSRP of ULPRS (e.g., sent from the serving ULP cell measurement quantity used in cell reselections). |
| $Q_{meas,n}$ | RSRP of ULPRS (e.g., sent from the neighboring ULP cell measurement quantity used in cell reselections). |
| $Q_{hyst}$ | Hysteresis value for ranking criteria, which may be given as a network configurable parameter. |

A ULP cell-ranking criterion (e.g., which takes into account Uu cell association and quality) may be applied, for example (e.g., in the example scenario shown in FIG. 8), if (e.g., when) there is a constraint on WTRU's connection establishment latency or to enable fast fallback to a Uu IDLE state. A cell-ranking criterion $R_s$ for a serving cell and a cell-ranking criterion $R_n$ for neighboring cells may be determined, respectively, for example, in accordance with Equations (11) and (12):

$$R_s = Q_{meas,s} + \alpha_{UuAnchor} Q_{UuRSmeas,s} + Q_{hyst} \qquad \text{Eq. (11)}$$

$$R_n = Q_{meas,n} + \alpha_{UuAnchor} Q_{UuRSmeas,n} \qquad \text{Eq. (12)}$$

Example descriptions of parameters/variables in equations (11) and (12) are provided in Table 5:

TABLE 5

| | |
|---|---|
| $Q_{UuRSmeas,s}$ | RSRP of UuRS (e.g., sent from the Uu cell associated with the serving ULP cell), which may represent the measurement quantity used in cell reselections. |
| $Q_{UuRSmeas,n}$ | RSRP of UuRS (e.g., sent from the Uu cell associated with a neighboring ULP cell), which may represent the measurement quantity used in cell reselections. |

TABLE 5-continued

| $\alpha_{UuAnchor}$ | Scaling factor to balance the link quality of a potentially selected ULP cell and the potential transition time from ULP RRC IDLE to Uu RRC IDLE and Uu RRC Connected state. |
|---|---|

A WTRU may (e.g., alternatively and/or additionally) consider UuRS measurement relaxation. A WTRU may utilize a (e.g., generic) cell-ranking criterion $R_s$ for a serving cell and cell-ranking criterion $R_n$ for neighboring cells, respectively, for example, in accordance with Equations (13) and (14) (e.g., which may be the same or similar to Equations (5) and (6):

$$R_s = Q_{meas,s} + Qoffset_{UuAnchorRSRP}(Q_{UuRSmeas,s}) + Q_{hyst} \qquad \text{Eq. (13)}$$

$$R_n = Q_{meas,n} + Qoffset_{UuAnchorRSRP}(Q_{UuRSmeas,n}) \qquad \text{Eq. (14)}$$

The function $Qoffset_{UuAnchorRSRP}$ may generate an offset that may be specific to the Uu cell associated with the serving/neighboring ULP cell. The function $Qoffset_{UuAnchorRSRP}$ may be determined, for example, based on a measured RSRP of a UuRS, an interpolated link quality of the Uu cell, as desired (e.g., selected, determined, or configured) by the WTRU, and/or as configured by network scaling factor.

A WTRU may leave ULP cell type1 coverage. In example mobility scenarios, a WTRU may leave ULP cell type 1 coverage into an area where (e.g., only) Uu coverage exists (e.g., no ULP coverage). A WTRU may (e.g., first) perform a state transition to Uu idle mode (e.g., as the ULP service may no longer be available). The WTRU may (e.g., after the cell reselection) start Uu operation on the Uu cell.

The principles described in the foregoing examples may be applied, for example, to one or more of the following mobility scenarios: ULP cell type1 to Uu cell mobility; ULP cell type1 to ULP cell type2 mobility; and/or ULP cell type1 to an area without ULP coverage of ULP cell type3 mobility.

FIG. 9 illustrates an example of cell reselection based on leaving ULP coverage. A state transition from ULP idle mode to Uu idle mode may be triggered, for example, based on a threshold (e.g., $Thresh_{UuSearch}$), which may be defined, (pre)configured, determined, specified, provided, etc. The WTRU may start a Uu cell search, for example, if/when the RSRP of the current serving ULP cell's ULPRS becomes less than or equal to the threshold (e.g., $Thresh_{UuSearch}$). A threshold parameter may be provided, for example, by a network (e.g., as a network configurable parameter). A value for a threshold may be fixed or variable. A WTRU may perform a mobility procedure, for example, as shown in FIG. 10.

Figure 10:
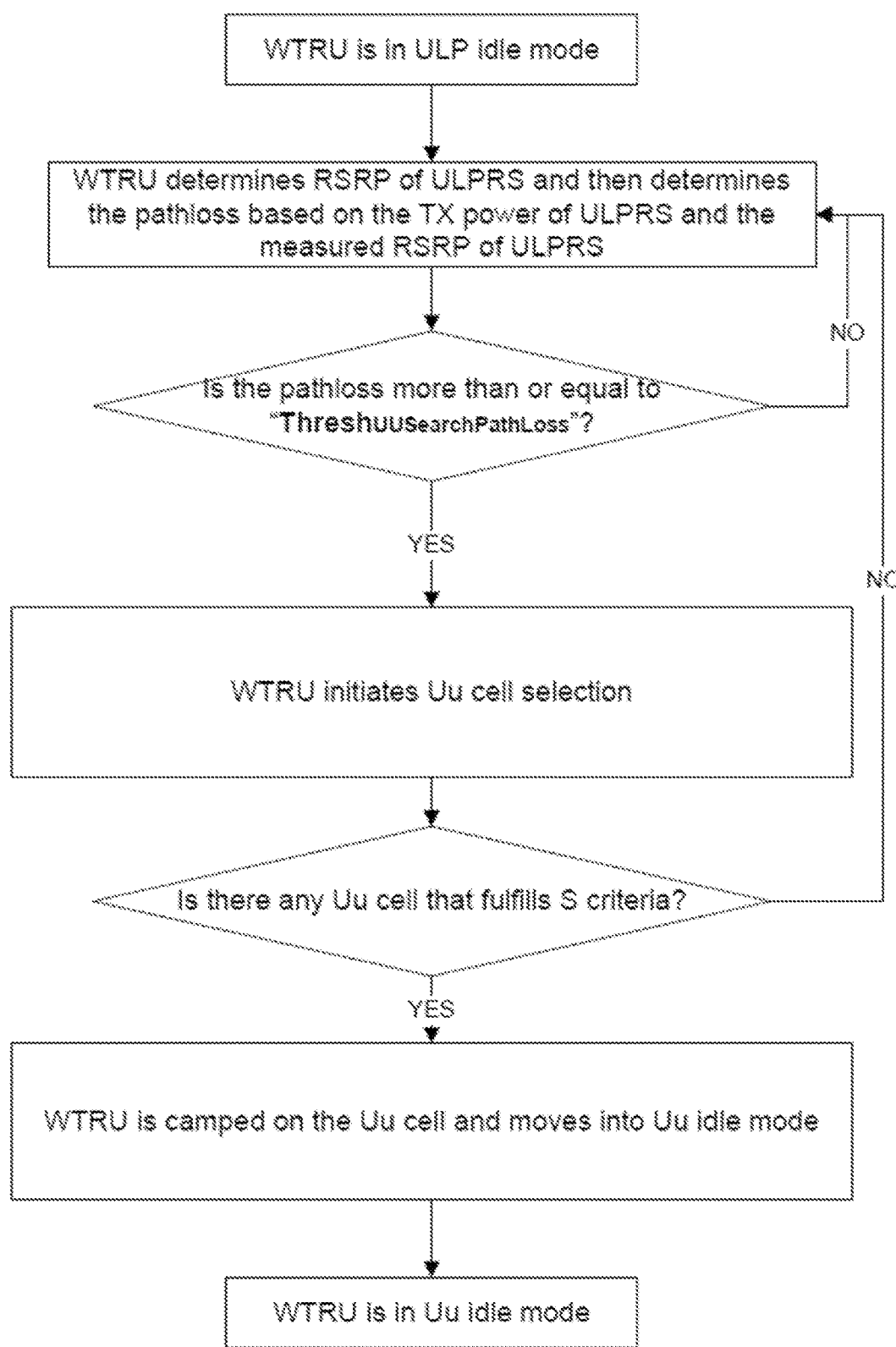
FIG. 10 illustrates an example of a Uu cell selection triggered in a ULP idle mode.

FIG. 10 illustrates an example of a Uu cell selection triggered in ULP idle mode. The example shown in FIG. 10 may correspond with a portion of the example procedure shown in FIG. 4 (e.g., 401, 402 (2), 420-423). There may be differences between FIGS. 4A and 10. For example, the example shown in FIG. 10 utilizes threshold $Thresh_{UuSearchPathloss}$ while the example shown in FIG. 4A utilizes threshold $Thresh_{UuSearchRSRP}$.

In some examples, $Thresh_{UuSearch}$ may be inverse-proportionally scaled based on battery status. In some examples, $Thresh_{UuSearch}$ may be defined against the battery level. A WTRU may initiate a Uu cell search, for example, if the battery level is greater than or equal to the value of $Thresh_{UuSearch}$.

A pathloss threshold (e.g., as described herein) may be used, for example (e.g., for the example scenario shown in FIG. 10), instead of using an absolute threshold $Thresh_{UuSearch}$.

A WTRU may refrain from determining (e.g., not determine, not be able to determine, refrain from finding out, not find out, not be able to find out) a (e.g., any) serving Uu cell (e.g., and may end up in an out-of-service state), for example, if there is not a neighboring Uu cell.

A threshold (e.g., $Thresh_{UuSearch}$) may be scaled. An energy saving requirement may vary, for example, based on the battery status, a WTRU type, an application type, and/or a service type. A threshold (e.g., $Thresh_{UuSearch}$) may be scaled, for example, based on battery status, a WTRU type, an application type, a service type, and/or the WTRU's mobility state.

In some examples (e.g., where a threshold may be scaled based on battery status), the threshold (e.g., $Thresh_{UuSearch}$) may be set (e.g., proportionally) according to the battery level. A WTRU may (e.g., expect to) stay in ULP idle mode (e.g., as much as possible), for example, if the battery level is low. The WTRU may take advantage of energy saving offered by a ULP interface. The WTRU may set the threshold (e.g., $Thresh_{UuSearch}$) to a lower value (e.g., to take advantage of energy saving offered by the ULP interface).

In some examples (e.g., where a threshold may be scaled based on WTRU type, application type, and/or service type), the threshold (e.g., $Thresh_{UuSearch}$) may be defined, for example, per WTRU type, application type or service type in a (pre)configuration or may be signaled (e.g., by the network per type). A WTRU type may include, for example, a traditional handset, a secondary handset (e.g., e-ink display based form-factors like Palm), an (e.g., traditional) IoT device, an energy-critical IoT device, an NR RedCap device, etc. In some examples (e.g. where a WTRU type is an energy-critical IoT device), an energy-critical IoT device may (e.g., attempt to) stay in an energy efficient state longer. A threshold (e.g., $Thresh_{UuSearch}$) may be set to a lower (e.g., relatively smaller) value (e.g., to stay in an energy efficient state longer). The same or similar example implementation may be applied for example scenarios (e.g., cases) where an application or a service may have (e.g., very) infrequent data to transmit/receive. A threshold (e.g., $Thresh_{UuSearch}$) may (e.g., otherwise) be set to a higher (e.g., relatively bigger) value than the energy saving preferred device/application/service.

In some examples (e.g., where a threshold may be scaled based on battery status), a threshold (e.g., $Thresh_{UuSearch}$) may be increased, for example, if/when the WTRU is moving (e.g., rather than stationary).

A WTRU may move into ULP cell type1 coverage. In some examples, a mobility scenario may include a WTRU moving from Uu coverage to ULP cell type 1 coverage. A WTRU may perform a (e.g., regular) cell reselection (e.g., Uu cell reselection), for example, to be camped on the Uu-ULP Hybrid cell. The WTRU may (e.g., after camping on the Uu-ULP Hybrid cell) perform a state transition from Uu idle mode to ULP idle mode, for example, as a ULP service becomes available for the WTRU. The same or similar example implementation may be applied to one or more of the following example mobility scenarios: Uu cell to ULP cell type1 mobility; Uu idle mode from ULP cell type2 to ULP cell type1 mobility; and/or Uu idle mode from ULP cell type3 to ULP cell type1 mobility.

Figure 11:
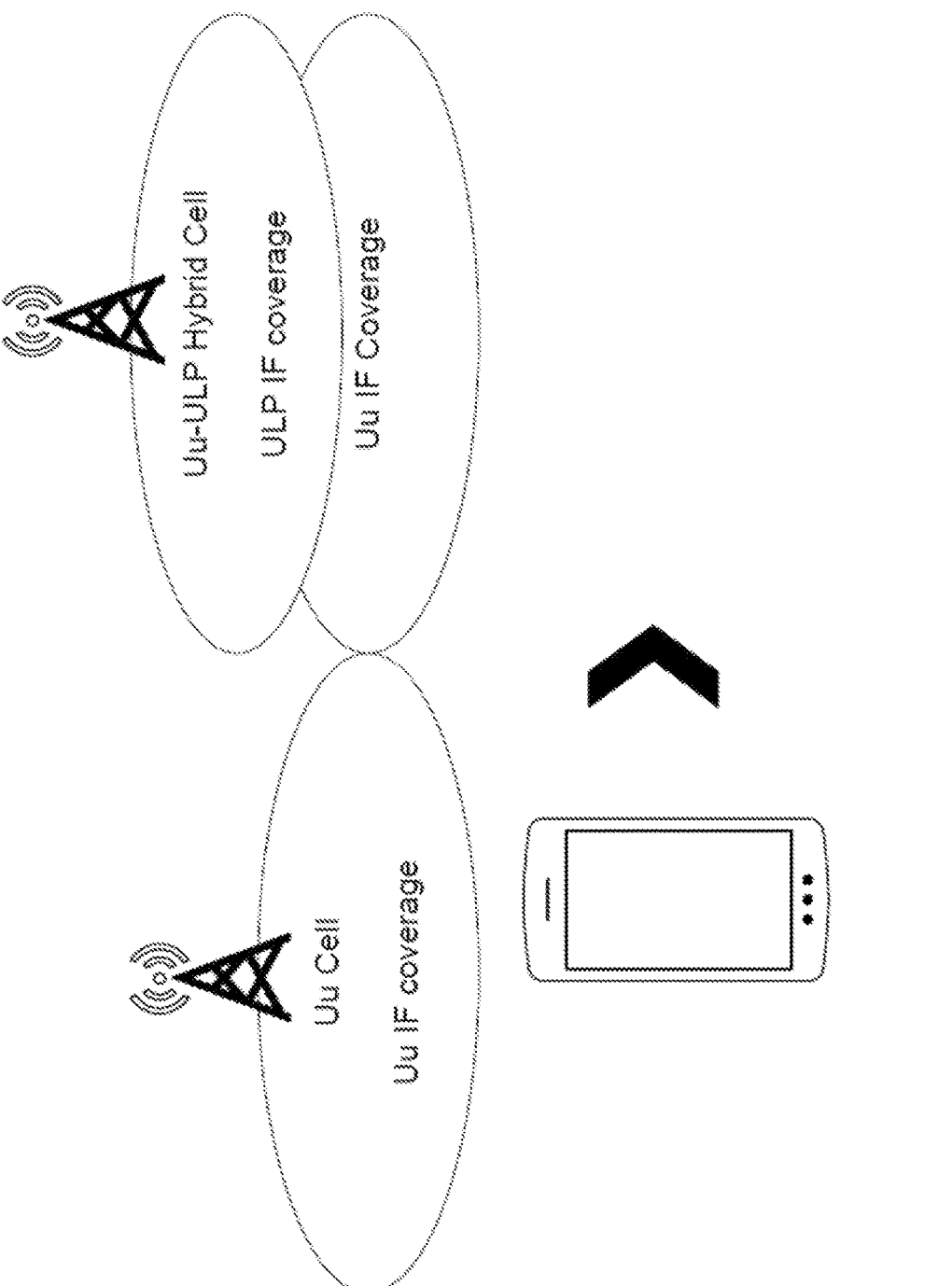
FIG. 11 illustrates an example of cell reselection from Uu coverage to ULP cell type1 coverage.

FIG. 11 illustrates an example of cell reselection from Uu coverage to ULP cell type1 coverage. A WTRU may (e.g., after cell reselection from a Uu cell) determine whether the Uu serving cell (e.g., the Uu cell the WTRU is camped on (e.g., connected to)_ after cell reselection, new serving Uu cell) has an (e.g., any) associated ULP cell. The WTRU may (e.g., if there is an associated ULP cell) attempt ULP cell selection. The WTRU may be camped on the ULP cell to obtain ULP related services (e.g., ULP data communication). An example procedure is shown in FIG. 12.

FIG. 12 illustrates an example of a state transition into ULP idle mode based on (e.g., upon) Uu cell reselection. The example shown in FIG. 12 may correspond to 601-605 in the example shown in FIG. 6. The ULP S criteria in the example shown in FIG. 12 may be as described herein.

There may be other scenarios for ULP cell type1. Other mobility scenarios (e.g., in addition to example mobility scenarios described herein) are shown in Table 6. The examples shown in Table 6 may assume the WTRU is currently camped on a ULP cell type 1).

TABLE 6

| WTRU state: | Destination ULP cell type: | | |
| --- | --- | --- | --- |
| | ULP cell type2 | ULP cell type3 | ULP cell type4 |
| ULP idle mode | This scenario is described herein | Several scenarios are described herein, such as if/when the destination is ULP coverage of ULP cell type3 and/or otherwise | Several scenarios are described herein, such as if/when the destination is ULP coverage of ULP cell type4 and/or otherwise |
| Uu idle mode | A (e.g., regular) cell reselection (e.g., Uu cell reselection) procedure may be applied. A WTRU may behave according to the new serving cell's ULP cell type. | | |

A WTRU may engage in mobility scenarios with ULP cell type2.

Figure 13:
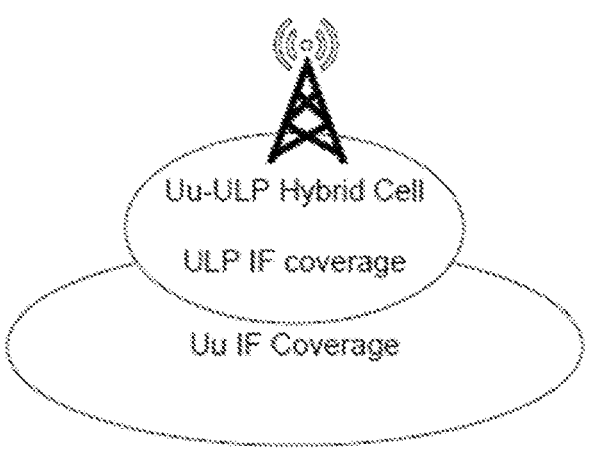
FIG. 13 illustrates an example of ULP cell type2.

FIG. 13 illustrates an example of ULP cell type2. Mobility scenarios may occur, for example, with regards to ULP cell type2 shown in FIG. 13. There may be several mobility scenarios in ULP cell type2 coverage. For example, a WTRU may move into ULP coverage of a ULP cell type2 cell and a WTRU may leave ULP coverage to Uu coverage.

Figure 14:
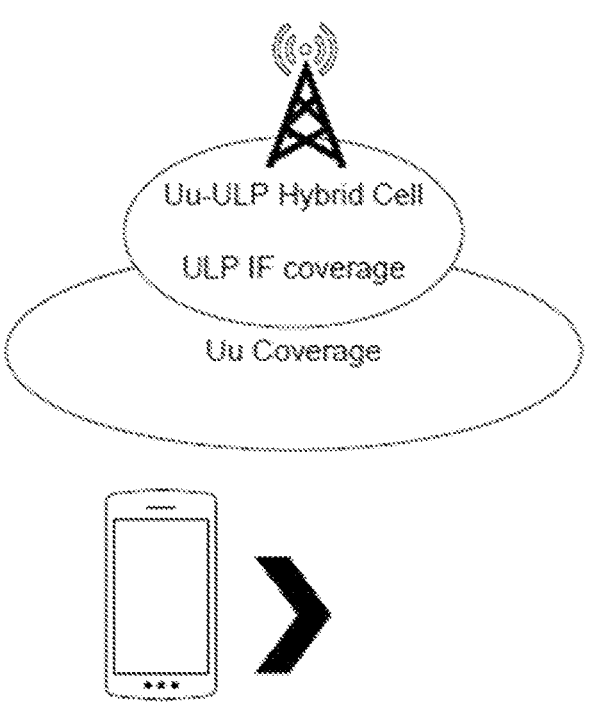
FIG. 14 illustrates an example of moving into ULP coverage of ULP cell type2.

FIG. 14 illustrates an example of moving into ULP coverage of ULP cell type2. A WTRU may perform (e.g., start) ULP cell selection, for example, if (e.g., when) the pathloss between the WTRU and the Uu cell becomes less than or equal to a threshold (e.g., ThreshULPsearchPathloss).

Figure 15:
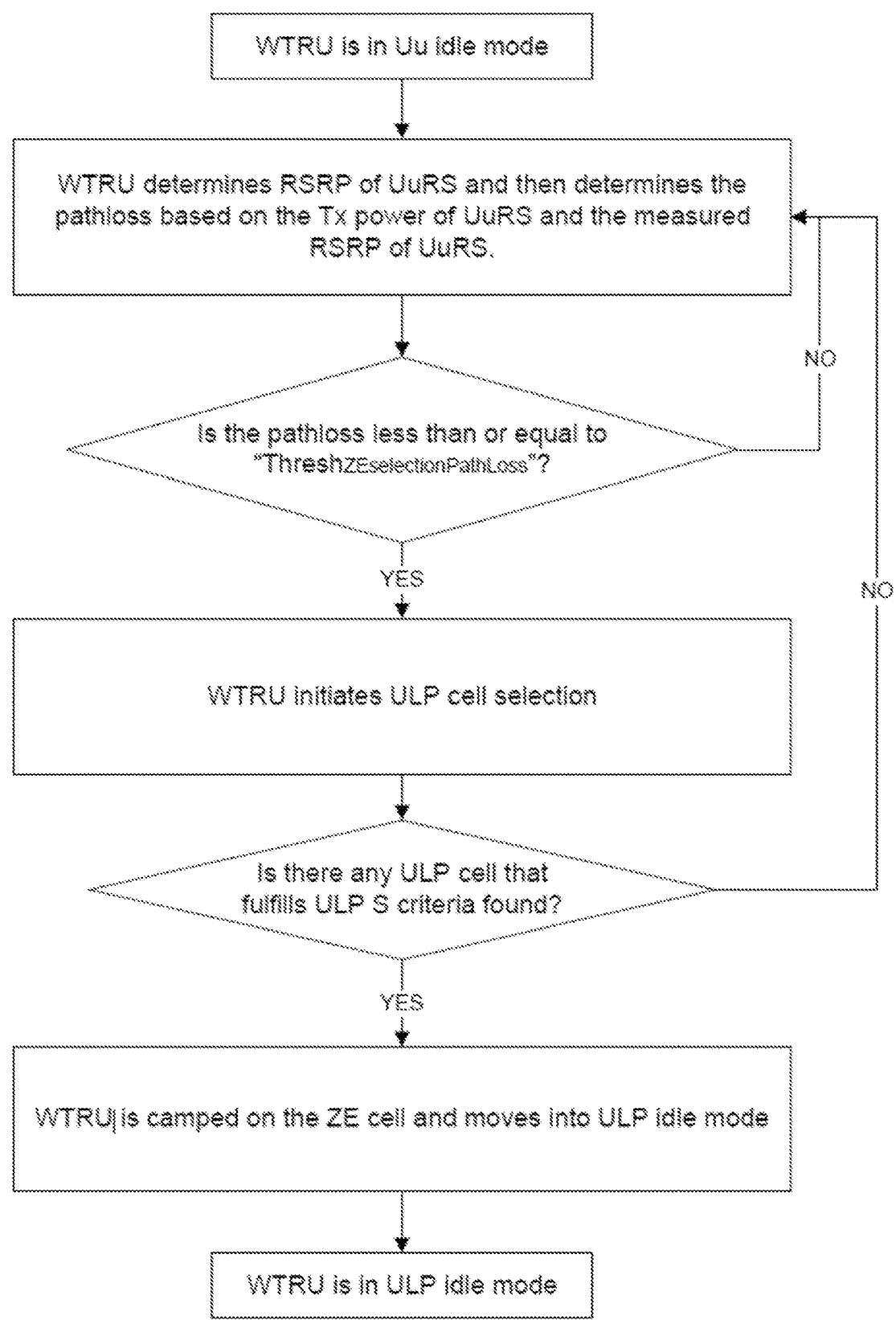
FIG. 15 illustrates an example of ULP cell selection in ULP cell type2.

FIG. 15 illustrates an example of ULP cell selection in ULP cell type2. The example shown in FIG. 15 may correspond to 601-605 in FIG. 6. The example shown in FIG. 15 may use threshold $Thresh_{ULPsearchPathloss}$ while the example shown in FIG. 6 may use threshold $Thresh_{ULPsearchRSRP}$.

A WTRU may know (e.g., need to know) the TX power of UuRS, for example, for the pathloss determination in the procedure. A network may provide the TX power information, for example, via system information or signaling (e.g., via RRC signaling, dedicated RRC signaling). The WTRU may (e.g., need to) determine the RSRP value of UuRS. A WTRU may determine the pathloss, for example, in accordance with Equation (15):

$$Pathloss = TX \text{ power of } UuRS - RSRP \text{ of } UuRS \qquad \text{Eq. (15)}$$

A WTRU may (e.g., alternatively and/or additionally) initiate ULP cell selection, for example, if (e.g., when) the RSRP of UuRS becomes larger than (e.g., or equal to) a threshold (e.g., as shown by example in FIG. 6 at 601). The threshold may be provided by a network (e.g., as a network configurable parameter) or the threshold may be a hard-coded value.

FIG. 16 illustrates an example of leaving ULP coverage of ULP cell type2. A WTRU may be camped on a Uu cell of ULP cell type2, for example, if (e.g., when) the WTRU leaves ULP coverage of ULP cell type2. The WTRU may (e.g., need to) perform Uu cell selection at the edge of the ULP coverage of ULP cell type2. The Uu cell selection may be triggered, for example, using ULPRS pathloss information.

FIG. 17 illustrates an example of a mobility procedure for leaving ULP coverage of ULP cell type2. A portion of the example shown in FIG. 17 may correspond to a portion of the example shown in FIG. 4A (e.g., 401, 402 (2), 420-423). The example shown in FIG. 17 may use threshold $Thresh_{UuSearchPathloss}$ While the examples shown in FIG. 4A uses threshold $Thresh_{UuSearchRSRP}$. The WTRU may (e.g., first) determine whether the associated Uu cell fulfills S criteria. The WTRU may initiate Uu cell selection, for example, (e.g., only) if the associated Uu cell doesn't fulfill the S criteria. The WTRU may (e.g., immediately) initiate Uu cell selection, for example, if (e.g., when) 402 condition (2) in FIG. 4A is not met.

A WTRU may know (e.g., need to know) the TX power of ULPRS, for example, for the pathloss determination in the procedure. A network may provide the TX power information, for example, via system information or signaling (e.g., via RRC signaling, dedicated RRC signaling). The WTRU may (e.g., also) determine the RSRP value of ULPRS. The WTRU may determine the pathloss, for example, in accordance with Equation (16):

$$Pathloss = TX \text{ power of } ULPRS - RSRP \text{ of } ULPRS \qquad \text{Eq. (16)}$$

A WTRU may (e.g., alternatively and/or additionally) initiate Uu cell selection, for example, if (e.g., when) the RSRP of ULPRS becomes less than (e.g., or equal to) a threshold (e.g., as shown by example in FIG. 4A). The threshold may be provided, for example, by a network (e.g., as a network configurable parameter) or the threshold may be a fixed (e.g., hard-coded) value.

The pathloss and/or the threshold may be scaled. An energy saving requirement may vary, for example, based on the battery status, WTRU type, application type, and/or service type. The pathloss and/or the threshold (e.g., as described herein) may be scaled.

In some examples (e.g., with an energy saving requirement varying based on battery status), a ULPRS based pathloss may be set to a value that is inversely proportional to the battery level. A WTRU may (e.g., expect to) stay in energy efficient state longer, for example, if the battery level is low. The pathloss may be scaled to a larger (e.g., bigger) value. The pathloss may (e.g., otherwise) be scaled to a smaller value, for example, to encourage the WTRU to move into Uu idle mode.

The logic may be inverted for an RSRP threshold. An RSRP threshold may be set to a value that is proportional to the battery level. The threshold may be scaled to a lower value, for example, if the battery level is low. The threshold may (e.g., otherwise) be scaled to a higher value. A similar implementation may be applied for a WTRU that is currently operating in the Uu idle mode, using a UuRS, during a transition to the ULP idle mode.

In some examples (e.g., with an energy saving requirement varying based on a WTRU type, an application type, and/or a service type), the ULPRS based pathloss may be set to a larger (e.g., bigger) value, for example, if the WTRU type, application type, or service type requires energy saving. A WTRU (e.g., an IoT device) may (e.g., want to) stay in an energy efficient state longer, for example, if the WTRU type is IoT device. The pathloss may be scaled to a larger (e.g., bigger) value. The pathloss may (e.g., otherwise) be scaled to a smaller value, for example, to encourage the WTRU to move into Uu idle mode.

The logic may be inverted for an RSRP threshold. The threshold may be set to a smaller value, for example, if the WTRU expects to stay in the energy efficient state (e.g., a ULP idle mode) longer. The threshold may be scaled to a lower value, for example, if the WTRU type is IoT device. The threshold may (e.g., otherwise) be scaled to a higher value.

Other scenarios may be implemented for ULP cell type2. Examples may describe ULP cell type2 relevant mobility scenarios, for example, apart from mobility within ULP cell type2.

In some example scenarios, a WTRU may leave ULP cell type2 to another cell type (e.g., ULP cell types1, 3, or 4). A WTRU may be in Uu idle mode, for example, if (e.g., when) the WTRU leaves ULP cell type2 coverage and moves into the other cell's coverage. A mobility procedure may be the same or similar to (e.g., regular) Uu cell mobility. For example, a legacy cell reselection procedure may be applied. Example procedures for a subsequent transition from Uu idle mode to ULP idle mode for a different cell type (e.g., type1, 3, or 4) are described herein.

In some example scenarios, a WTRU may move into ULP cell type2 from another cell type (e.g., ULP cell type1, 3, or 4). There may not be ULP coverage at the edge of ULP cell type2 coverage, for example, if (e.g., when) a WTRU moves into ULP cell type2 coverage. The WTRU may be in Uu idle mode. The mobility procedure may be the same as or similar to (e.g., regular) Uu cell mobility. A legacy cell reselection procedure may be applied.

Examples are described for ULP cell type3.

Figure 18:
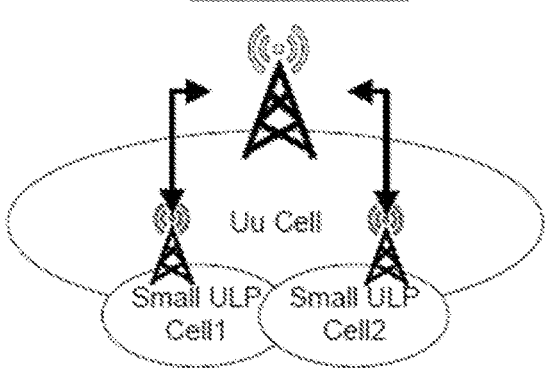
FIG. 18 illustrates an example of a ULP cell type3.

FIG. 18 illustrates an example of ULP cell type3. Examples of mobility scenarios are described with regard to ULP cell type3 shown in FIG. 18.

Cell reselection may be performed between ULP cells. A cell reselection procedure may be implemented, for example, if (e.g., when) a WTRU moves between ULP cells (e.g., as shown by example in FIG. 19).

Figure 19:
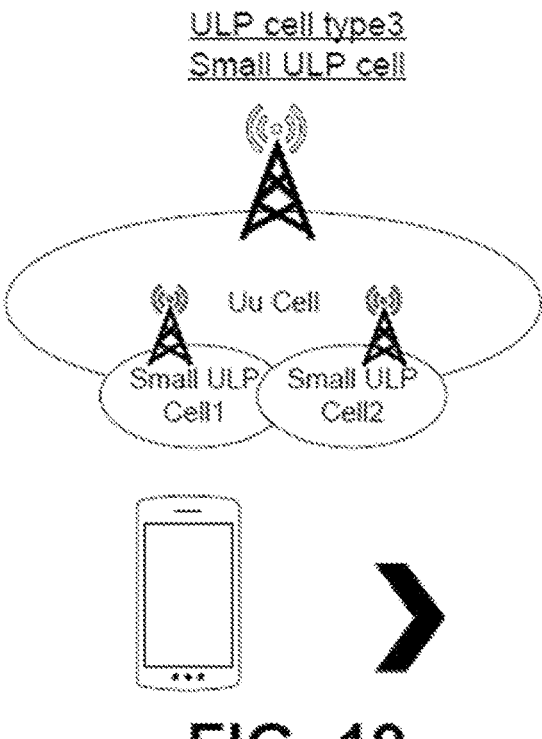
FIG. 19 illustrates an example of a ULP cell reselection scenario.

FIG. 19 illustrates an example of a ULP cell reselection scenario.

ULP cell reselection ranking may be implemented with a power consumption constraint. A WTRU may perform ULP cell reselection across ULP cells with ULP cell reselection criteria (e.g., as described herein).

A WTRU may implement a ULP cell reselection procedure. A WTRU may (e.g., as described herein) take into account (e.g., consider) multiple (e.g., two) factors for a ULP cell reselection procedure. For example, a WTRU may consider a ULPRS quality of a (e.g., each) ULP cell and/or Uu-ULP cell association for a ULP cell reselection procedure.

Figure 20:
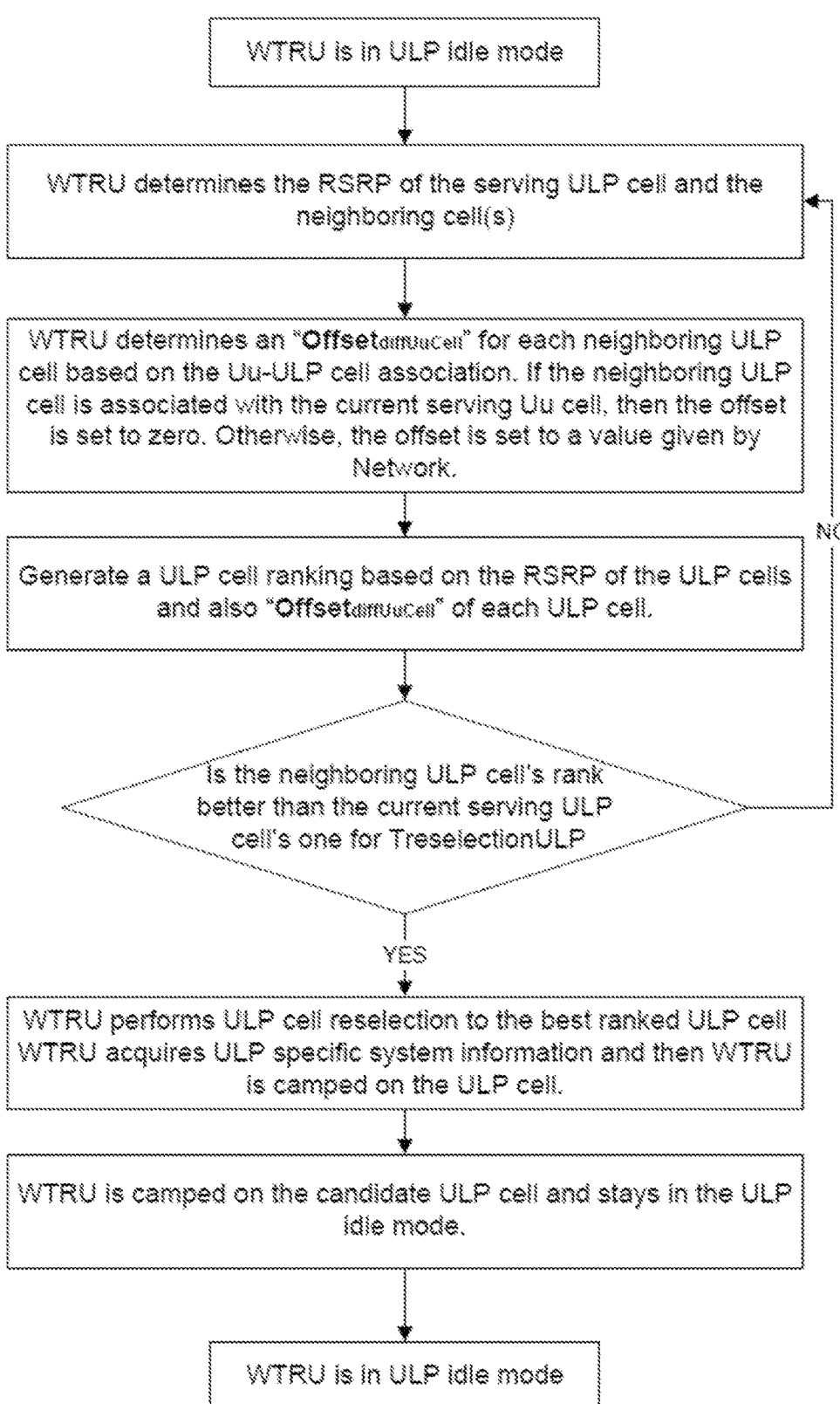
FIG. 20 illustrates an example of a ULP cell reselection procedure.

A ULP cell reselection procedure may comprise, for example, determining RSRP of ULPRS, generating a ranking ULP cell list with the RSRP, and/or selecting a candidate ULP cell (e.g., as shown by example in FIG. 20).

FIG. 20 illustrates an example of a ULP cell reselection procedure. A portion of the example procedure shown in FIG. 20 may correspond to a portion of the example shown in FIG. 4A (e.g., 401-405 in FIG. 4A).

The ULP cell reselection criteria may be applied, for example, for the small ULP cells of ULP cell type3. The ULP cell reselection criteria may be applied for other ULP cells of other ULP cell types, for example, if the ULP cells are neighboring to the current serving ULP cell.

ULP cell reselection ranking may be implemented with a fast fallback to Uu IDLE state constraint. A WTRU may perform ULP cell reselection across ULP cells with ULP cell reselection criteria (e.g., as described herein).

A WTRU may (e.g., as described herein) receive and/or determine (e.g., via system information or (pre)configuration information) one or more of the following cell selection (e.g., reselection) and IDLE states transition parameters/configuration information: cell quality hysteresis (e.g., $Q_{hyst}$), for example, for ranking criteria; ULPRS and UuRS measurement mapping information (e.g., carrier frequency/band of operation, transmit signal power, number of allocated resources, number of transmit antennas/beamforming, and/or the like); mapping function(s) between a measured RSRP of an UuRS and/or interpolated link quality of the Uu cell, and serving/neighboring cell quality offsets (e.g., Qoffset$_{UuAnchorRSRP,s}$ and Qoffset$_{UuAnchorRSRP,n}$); and/or measurement thresholds and configuration information that may be used for IDLE states transition and UuRS measurement relaxation.

The WTRU may operate in ULP RRC IDLE state. The WTRU may monitor the RSRP of ULPRS of serving/neighboring ULP cells. The WTRU may follow UuRS relaxed measurements configuration information, for example, if (e.g., on a condition that) the WTRU determines that the WTRU is at the ULP cell edge and/or has low mobility. The WTRU may (e.g., otherwise) deprioritize requirements (e.g., decide to deprioritize requirements) on IDLE-to-CONNECTED states transition delay or transition to a Uu IDLE state (e.g., to maintain the requirement). The WTRU may utilize the UuRS and ULPRS measurements and/or received/configured measurement mapping information, for example, to interpolate RSRP values indicating the link quality of Uu cells associated with serving and neighboring ULP cells. The WTRU may determine quality offsets for serving and neighboring ULP cells, for example, based on interpolated RSRP values and/or received/preconfigured mapping function(s). The WTRU may generate a cell ranking list, for example, according to the criteria defined in Equations (5) and (6). The WTRU may select a (e.g., the highest) ranked ULP cell. The WTRU may camp on the ULP cell, for example, if (e.g., on a condition that) the selected ULP cell satisfies the S criteria.

A WTRU may move into small ULP cell coverage. A cell selection procedure may be used to move into small ULP cell coverage (e.g., as shown by example in FIG. 21).

Figure 21:
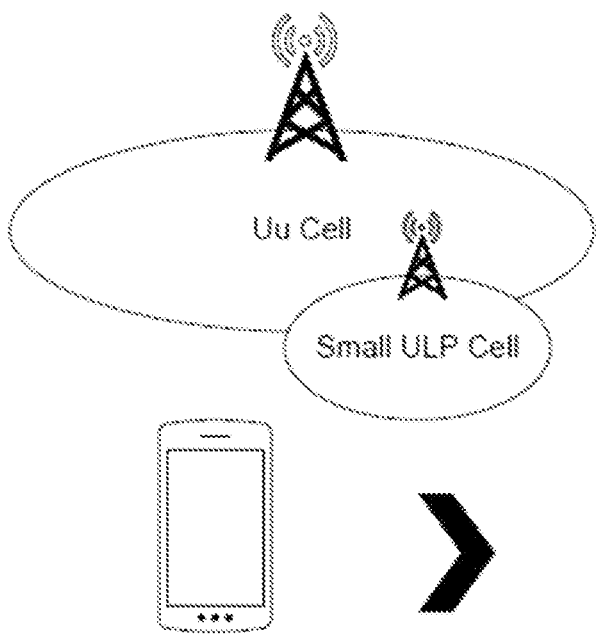
FIG. 21 illustrates an example of moving into small ULP cell coverage of ULP cell type3.

FIG. 21 illustrates an example of moving into small ULP cell coverage of ULP cell type3.

A WTRU may implement a ULP cell selection procedure. A ULP capable WTRU may (e.g., expect to) move into ULP idle mode, for example, if (e.g., whenever) a ULP cell is available for the WTRU. The WTRU may obtain a downlink signaling service, for example, via a ULP receiver with ultra low power consumption. A WTRU (e.g., in Uu idle mode) may (e.g., attempt to) perform ULP cell selection (e.g., with a time interval). A time interval may be provided (e.g., given or configured), for example, as part of ULP configuration information (e.g., $T_{ULPtransition}$). The time interval (e.g., $T_{ULPtransition}$) may be scaled, for example, based on the number of ULP cells associated with the serving Uu cell, the WTRU's mobility state, and/or the WTRU's battery status (e.g., as described herein). A WTRU may perform the ULP cell selection procedure for one or more example scenarios, such as moving from Uu coverage of a ULP cell type3 cell to ULP coverage of the ULP cell type3 cell. An example procedure is shown in FIG. 22.

Figure 22:
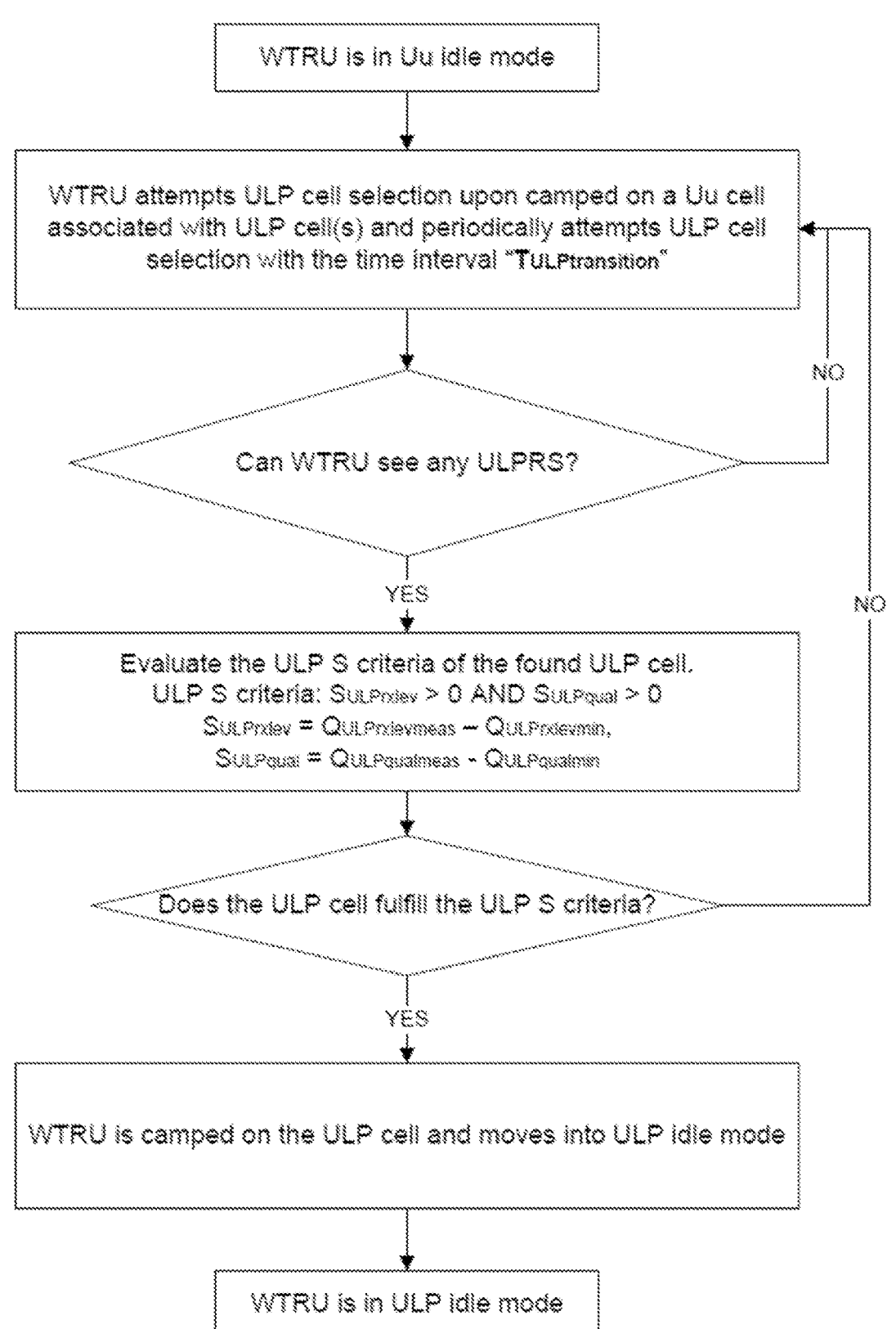
FIG. 22 illustrates an example of a ULP cell selection procedure.

FIG. 22 illustrates an example of a ULP cell selection procedure. A portion of the example shown in FIG. 22 may correspond to a portion of the example shown in FIG. 6 (e.g., 601-605).

Figure 24:
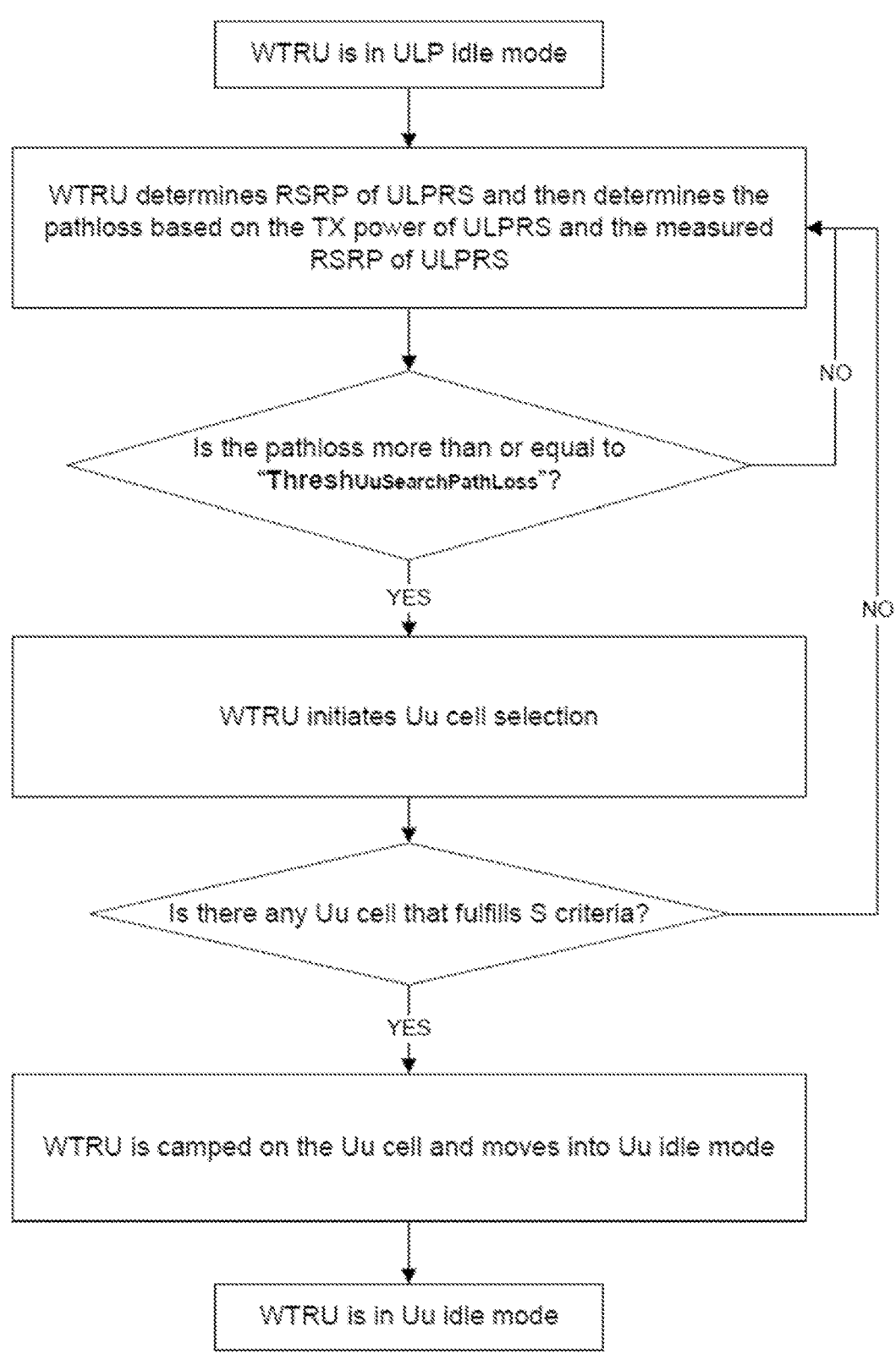
FIG. 24 illustrates an example procedure for leaving ULP coverage of a ULP cell type3.

Cell selection criteria for ULP may include ULP-S criteria. A WTRU may perform ULP cell selection, for example, via measuring ULPRS and checking ULP-S criteria (e.g., as described herein).

in FIG. 24 may correspond to a portion of the example shown in FIG. 4A (e.g., 401, 402, 404 (2), 420-423 of FIG. 4A). The example shown in FIG. 24 may use threshold $Thresh_{UuSearchPathloss}$ while the example shown in FIG. 4A may use threshold $Thresh_{UuSearchRSRP}$.

A WTRU may know (e.g., need to know) the TX power of ULPRS for the pathloss determination in the procedure. A network may provide the TX power information (e.g., via system information or signaling, such as via dedicated RRC signaling). The WTRU may determine the RSRP value of ULPRS. The WTRU may determine the pathloss, for example, in accordance with Equation (17):

$$Pathloss = TX \text{ power of } ULPRS - RSRP \text{ of } ULPRS \qquad \text{Eq. (17)}$$

A WTRU may (e.g., alternatively and/or additionally) initiate Uu cell selection, for example, if (e.g., when) the RSRP of ULPRS becomes less than or equal to a threshold (e.g., as shown by example in FIG. 4A). The threshold may be provided by the network (e.g., as a network configurable parameter) or the threshold may be hard-coded. This (e.g., alternative or additional) Uu cell selection procedure may be implemented, for example, as described herein in several examples.

Other mobility scenarios may be implemented for ULP cell type3.

In an example mobility scenario, a WTRU may leave ULP cell type3 to move to another cell type (e.g., ULP cell types1, 2, or 4). A mobility scenario may be determined based on the presence of the neighboring ULP cell(s) and the current WTRU state (e.g., ULP idle mode or Uu idle mode), for example, if (e.g., when) the WTRU leaves ULP cell type3 coverage and moves into the other cell's coverage. Table 7 shows example summaries of WTRU behaviors/procedures that may be applied for each of multiple scenarios.

TABLE 7

| WTRU state: | Neighbor ULP cell status: | |
| | Neighboring ULP cell exists | No neighboring ULP cell exists |
| --- | --- | --- |
| ULP idle mode | ULP cell reselection procedure may be applied. | Leaving small ULP cell coverage procedure may be applied. |
| Uu idle mode | A (e.g., regular) cell reselection (e.g., Uu cell reselection) procedure may be applied. The WTRU may behave according to the new serving cell's ULP cell type. | |

Figure 23:
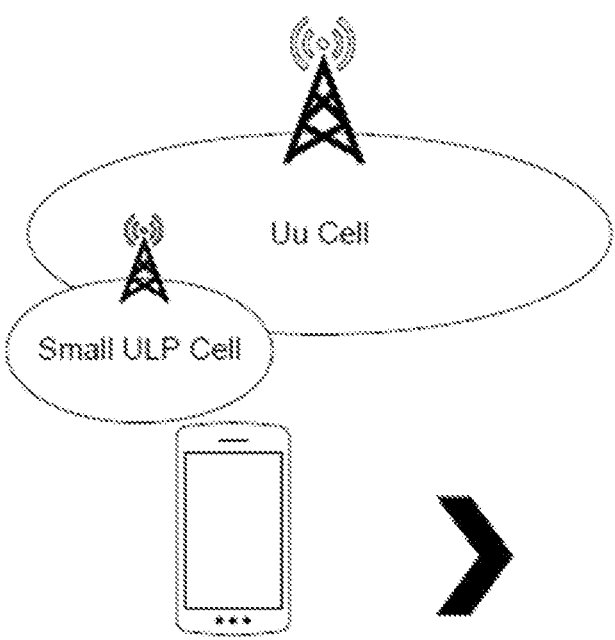
FIG. 23 illustrates an example of leaving ULP coverage of a ULP cell type3.

A WTRU may leave small ULP cell coverage (e.g., as shown by example in FIG. 23).

FIG. 23 illustrates an example of leaving ULP coverage of ULP cell type3.

A WTRU may be camped on a Uu cell, for example, if (e.g., when) the WTRU leaves ULP coverage of ULP cell type3. The WTRU may (e.g., need to) perform Uu cell selection at the edge of the ULP coverage of ULP cell type3. The Uu cell selection may be triggered, for example, using ULPRS pathloss information. FIG. 17 shows an example of the mobility procedure for leaving ULP coverage of ULP cell type3.

FIG. 24 illustrates an example procedure for leaving ULP coverage of ULP cell type3. A portion of the example shown In an example mobility scenario, a WTRU may move into ULP cell type3 from another cell type (e.g., ULP cell type1, 2, or 4). A mobility scenario may be determined based on the presence of the neighboring ULP cell(s) at the serving ULP cell type3 that the WTRU has moved to (e.g., new serving ULP cell type3) and the current WTRU state (e.g., ULP idle mode or Uu idle mode), for example, if (e.g., when) the WTRU moves into ULP cell type3 coverage from the other cell type's coverage. Table 8 shows example summaries of WTRU behaviors/procedures that may be applied for each of multiple scenarios.

TABLE 8

| | ULP coverage status: | |
|---|---|---|
| WTRU state: | In ULP coverage of the current ULP cell type3 | Out of ULP coverage of the current ULP cell type3 |
| ULP idle mode | ULP cell reselection procedure may be applied. | Leaving small ULP cell coverage procedure may be applied. |
| Uu idle mode | A (e.g., regular) cell reselection (e.g., Uu cell reselection) procedure may be applied. The WTRU may behave according to the new serving cell's ULP cell type. | |

Figure 25:
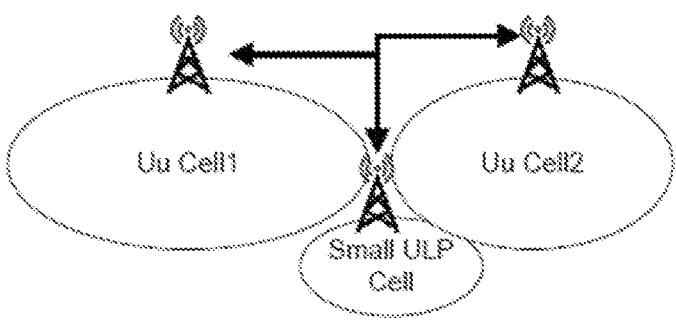
FIG. 25 illustrates an example of a ULP cell type4.

Examples are described for mobility scenarios with respect to ULP cell type4 (e.g., as shown by example in FIG. 25).

FIG. 25 illustrates an example of ULP cell type4. Mobility between Uu cells may be associated with a ULP cell (e.g., small ULP cell, the same small ULP cell).

Figure 26:
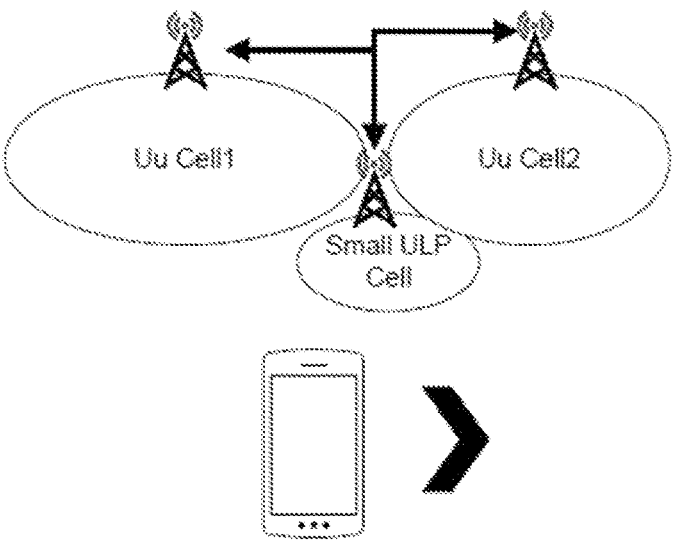
FIG. 26 illustrates an example mobility scenario of Uu cell reselection between one or more Uu cells associated with the same small ULP cell.

FIG. 26 illustrates an example mobility scenario of Uu cell reselection between Uu cells associated with the same small ULP cell.

A WTRU may be in Uu idle mode. The WTRU may perform a (e.g., regular) cell reselection procedure for the support of the mobility scenario. The WTRU may perform a (e.g., frequent) ULP cell search, for example, if (e.g., as long as) the serving Uu cell has associated ULP cells.

A WTRU may implement one of several procedures, for example, if (e.g., when) the WTRU is in ULP idle mode. In some examples, a WTRU may monitor (e.g., only) the RSRP of the serving small ULP cell. The WTRU may be camped on the small ULP cell, for example, if (e.g., as long as) the RSRP is strong enough and ULP cell reselection criteria are not met. In examples, a WTRU may (e.g., fully) take advantage of battery energy saving gain via a ULP-Uu interface. A state transition from ULP idle mode to Uu idle mode may take longer, for example, as the WTRU may perform Uu cell selection for the state transition and/or the WTRU may perform SI acquisition during the state transition, which may (e.g., significantly) compromise the call set-up time.

Figure 27:
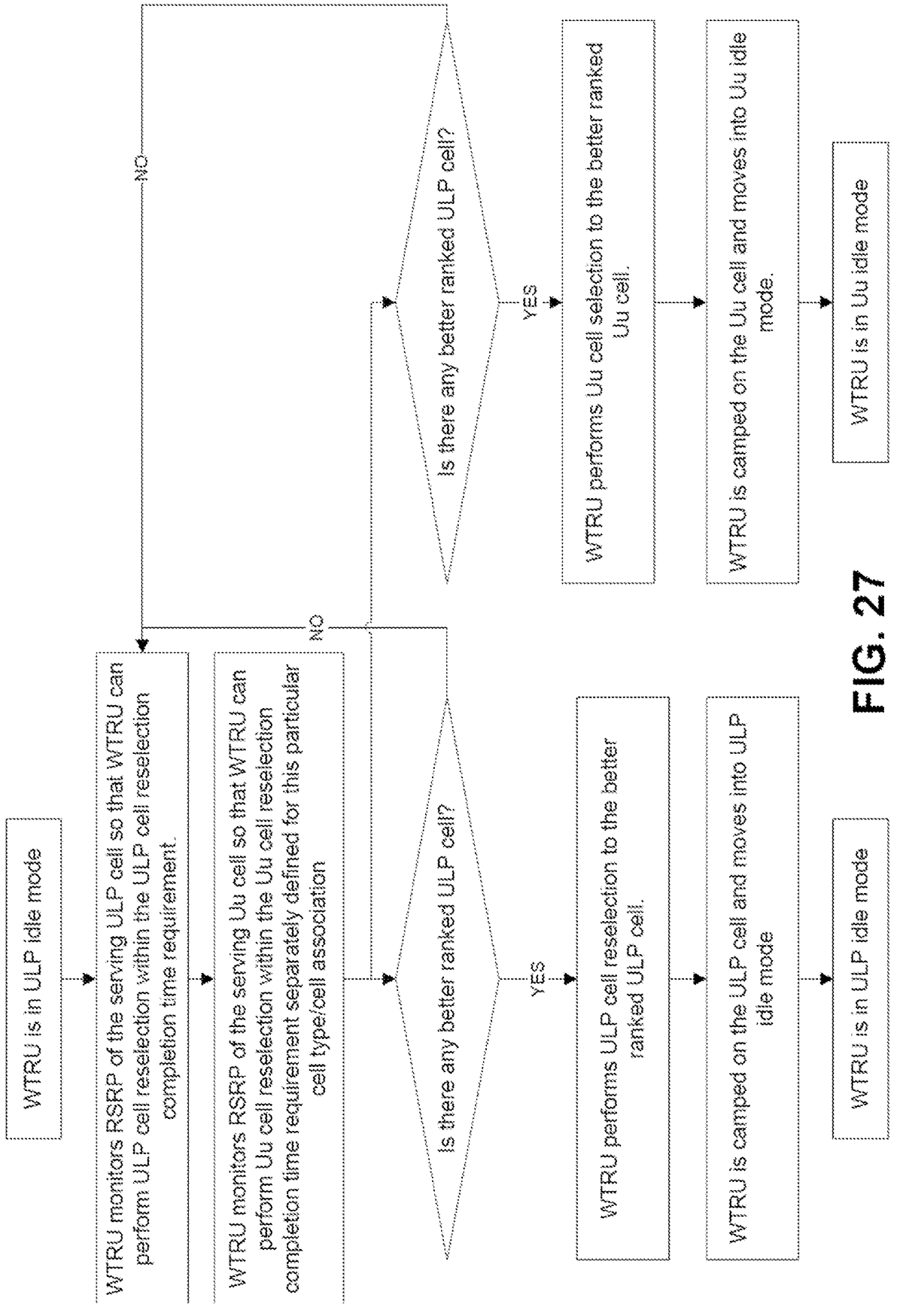
FIG. 27 illustrates an example of a cell reselection procedure for a ULP cell type4 with monitoring of the RSRP of a serving ULP cell.

In some examples (e.g., as shown in FIG. 27), a WTRU may monitor the RSRP of the serving small ULP cell and the Uu cell associated with the small ULP cell. The WTRU may perform ULP cell reselection or Uu cell reselection, for example, if the respective cell reselection criteria are met (e.g., Uu cell reselection criteria or ULP cell reselection criteria, such as described herein). A WTRU may refrain from taking advantage (e.g., not take advantage) of a ULP receiver's small energy consumption reception benefit, for example, if the WTRU (e.g., very) frequently monitors a Uu cell's RSRP. The periodicity of a Uu cell's RSRP monitoring may be relaxed, for example, to avoid extensive battery drain. A Uu cell monitoring requirement for ULP idle mode may be defined (e.g., configured, specified, selected, provided, and/or the like). The time for completion of Uu cell reselection may be more relaxed than a (e.g., regular) Uu cell reselection time.

FIG. 27 illustrates an example of a cell reselection procedure for ULP cell type4 with monitoring of the RSRP of a serving ULP cell. A portion of the example shown in FIG. 27 may correspond to a portion of the example shown in FIG. 4A (e.g., 401-405, 420-423 in FIG. 4A).

A scaling factor may be applied for Uu cell reselection. A WTRU may (e.g., attempt to) avoid Uu cell monitoring, for example, if (e.g., when) the battery remaining level is low. A WTRU may (e.g., proactively) monitor the Uu cell in ULP idle mode, for example, if (e.g., when) the battery remaining level is greater than a threshold.

A Uu cell reselection completion time requirement (e.g., as described herein) may be scaled, for example, based on the battery status and/or based on WTRU (e.g., device) type, application type, and/or service type.

In some examples (e.g., for a Uu cell reselection completion time scaled based on battery status), the time duration of a Uu cell reselection completion time may be prolonged (e.g., or set to infinity), for example, if the battery level is low (e.g., quite low) while the time duration may be set to a shorter value (e.g., a finite multiples of the regular cell reselection requirement), for example, if the battery level is high.

In some examples (e.g., for a Uu cell reselection completion time scaled based on WTRU/device type, application type, and/or service type), the requirement may be defined per WTRU type, application type, and/or service type or the time duration may be signaled by the network per type.

A WTRU may select a mobility option based on WTRU type, application type, and/or service type. An energy saving requirement may vary, for example, based on WTRU type, application type, or service type. A ULP idle mode scenario implementation may be selected, for example, based on WTRU type, application type, or service type. A WTRU may be unconcerned about a call setup time (e.g., assign a lower priority to call setup time) but may care about energy saving (e.g., assign a higher priority to energy saving), for example, if the WTRU type is an IoT device with a (e.g., very) small battery. A WTRU select an option that may refrain from implementing (e.g., not implement) Uu cell monitoring in ULP idle mode. A WTRU may select an option to monitor the RSRP of the serving small ULP cell and the Uu cell associated with the small ULP cell, for example, if an application has a latency requirement (e.g., stringent latency requirement).

Other mobility scenarios may be implemented for ULP cell type4. Table 9 provides example summaries of some mobility scenarios for ULP cell type4.

TABLE 9

| | Destination ULP cell presence: | |
|---|---|---|
| WTRU state: | ULP cell coverage | No ULP cell coverage |
| ULP idle mode | ULP cell reselection procedure may be applied. | Leaving ULP cell coverage procedure may be applied. |
| Uu idle mode | Moving into ULP cell coverage procedure may be applied. | A (e.g., regular) cell reselection procedure may be applied. |

Additional mobility scenarios may be implemented. For example, registration may be provided for a ULP network. ULP capability signaling may be provided in a registration request. ULP configuration information provisioning may be provided. A WTRU may indicate an interest in operating over ULP-Uu, for example, using the establishmentCause information element (IE) in a message (e.g., an RRCSetupRequest message). A WTRU may indicate an interest in operating over ULP-Uu, for example, using the content of an initial WTRU message in the (e.g., RRCSetupComplete) message (e.g., a registration request initial WTRU message with a registration type set to mobility registration update).

A network may provide ULP access stratum (AS) configuration information. A WTRU may receive a registration accept message (e.g., from the AMF), which may indicate the network acceptance of a WTRU's transition and ULP-related network parameters. A WTRU may configure the WTRU's ULP receiver. The WTRU may send a registration complete message (e.g., to the AMF), for example, to acknowledge ULP-related configuration information. A connection release may be initiated (e.g., the AMF may initiate a connection release). The RAN may provide a ULP-related RAN parameter (e.g., a ULP feature transition priority with an associated validity timer value).

Figure 28:
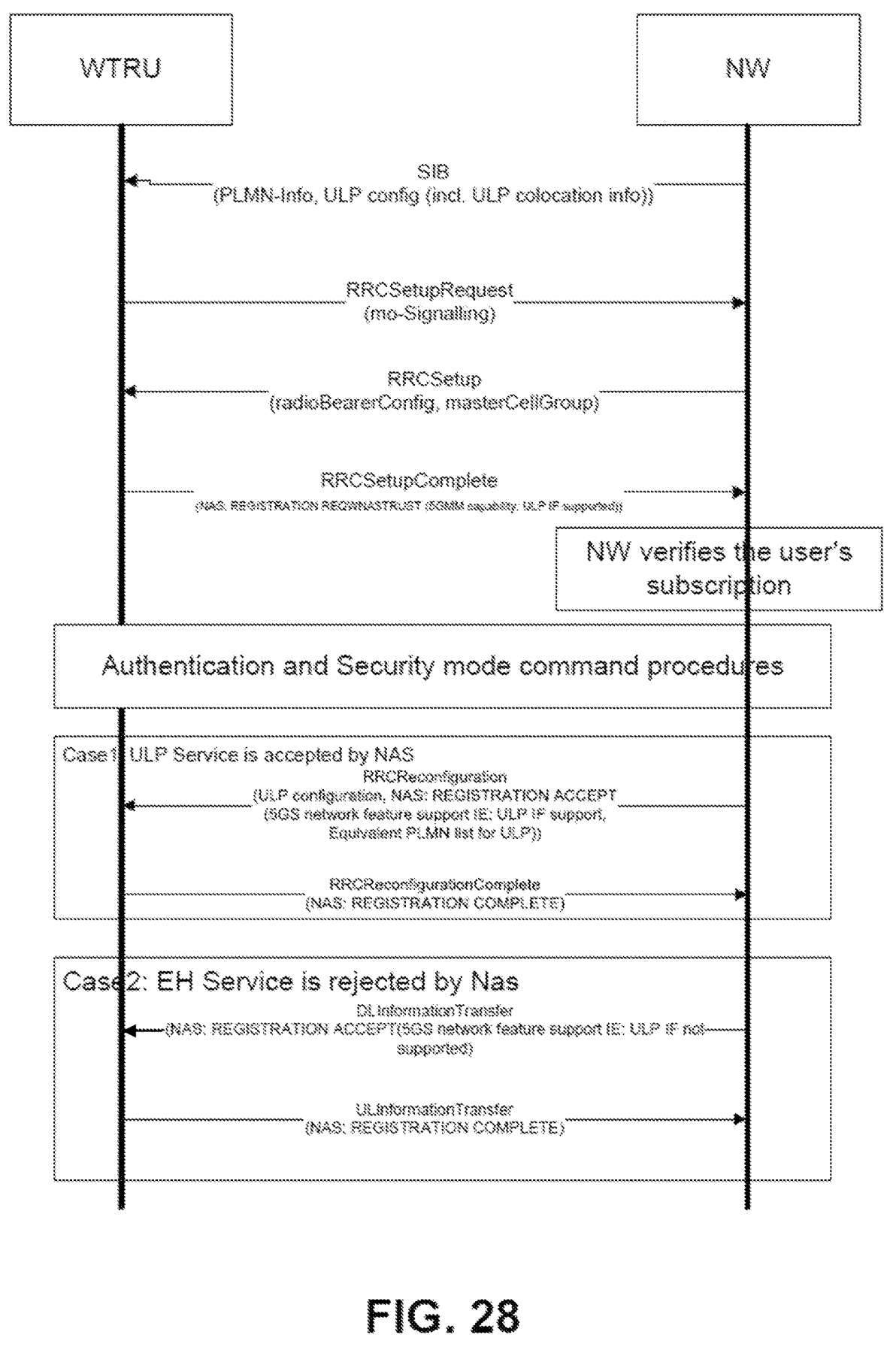

FIG. 28 illustrates an example of a ULP registration procedure.

A ULP capable WTRU may make a PLMN selection. A WTRU may perform a PLMN selection for ULP service across one or more PLMNs included in an equivalent PLMN list for ULP service (e.g., provided during a registration procedure), for example, if (e.g., when) a user of a WTRU may (e.g., expect to) obtain a ULP service.

A PLMN may be prioritized. A ULP capable WTRU may (e.g., be able to) determine which type of PLMN is prioritized. A ULP available PLMN may be prioritized over a ULP not-available PLMN (e.g., a preference may be up to a user or mobile subscriber (MS) setting), for example, if the WTRU may (e.g., expect to) use a ULP interface for energy saving.

A WTRU may (e.g., if ULP PLMN is prioritized) search (e.g., all) available PLMNs and report (e.g., to the non-access stratum (NAS) layer) PLMN identities (e.g., all PLMN identities), for example, with ULP-Uu-IF availability information and/or quality of the cell information (e.g., RSRP of the ULPRS). A cell selection procedure may be requested (e.g., the NAS layer may request the AS layer to perform a cell selection procedure), for example, to select a suitable cell (e.g., of the NAS) selected ULP available PLMN to camp on. The WTRU may (e.g., continuously) perform ULP PLMN selection, for example, if (e.g., while) the WTRU is camped on a cell on a ULP not-available PLMN (e.g., may be similar to a home PLMN (HPLMN) search while the WTRU is in a roaming area).

The tracking area/registration area may be added to a list of forbidden location areas for ULP, for example, if (e.g., when) the MS is informed that an area is forbidden, e.g., to prevent repeated attempts to have a ULP service on a ULP not allowed area. The list may be deleted, for example, if (e.g., when) the MS is switched off, if (e.g., when) the subscriber identity module (SIM) is removed, and/or periodically (e.g., every 12 to 24 hours).

A cause value may be used to signal a ULP forbidden location area. A WTRU may add the tracking area/registration area in the list of forbidden location areas for ULP, for example, if the following cause #X is signaled by the NAS message (e.g., REGISTRATION REJECT). Cause #X may indicate whether a ULP mode is not allowed. The 5G mobility management (MM) (5GMM) cause may be sent to a WTRU, which may request ULP service, for example, where the WTRU (e.g., by subscription or operator policy) may not be allowed to operate in ULP mode.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed:

1. A wireless transmit/receive unit (WTRU) connected to a first Uu cell and a first ultra low power (ULP) cell associated with the first Uu cell, the WTRU comprising:
a processor configured to:
determine whether a first measurement associated with the first ULP cell is below a first threshold;
based on a determination that the first measurement associated with the first ULP cell is below the first threshold, perform a second measurement on a second ULP cell associated with the first Uu cell and a third measurement on a third ULP cell associated with a second Uu cell;
determine a measurement offset based on an association between the third ULP cell and the second Uu cell;
determine a signal quality associated with the second ULP cell and a signal quality associated with the third ULP cell, wherein the signal quality associated with the second ULP cell is based on the second measurement, and wherein the signal quality associated with the third ULP cell is based on the third measurement and the determined measurement offset;
select a ULP cell from the second ULP cell and the third ULP cell based on the determined signal qualities, wherein the selected ULP cell is associated with a highest signal quality; and
use the selected ULP cell.

2. The WTRU of claim 1, wherein being configured to use the selected ULP cell comprises being configured to camp on the selected ULP cell using ULP configuration information.

3. The WTRU of claim 2, wherein the ULP configuration information is obtained from the selected ULP cell.

4. The WTRU of claim 1, wherein the first Uu cell is a serving Uu cell and the second Uu cell is a neighboring Uu cell.

5. The WTRU of claim 1, wherein the WTRU is not connected to the second Uu cell at a time associated with the performed second measurement and third measurement.

6. The WTRU of claim 1, wherein for the signal quality associated with the second ULP cell a measurement offset associated with the second ULP cell is zero or an offset for the second ULP cell is not applied.

7. The WTRU of claim 1, wherein the processor is further configured to:

detect an out-of-ULP service event, wherein the detection of the out-of-ULP service event is based on a determination that the first measurement, the second measurement, and the third measurement are below a second threshold;

based on the detected out-of-ULP service event, obtain Uu configuration information associated with a third Uu cell; and camp on the third Uu cell using the obtained Uu configuration information.

8. The WTRU of claim 1, wherein the processor is further configured to camp on the third ULP cell and the second Uu cell.

9. The WTRU of claim 8, wherein the processor is configured to camp on the second Uu cell based on a connection establishment latency constraint.

10. A method comprising:

a processor configured to:

determining whether a first measurement associated with a first ultra low power (ULP) cell is below a first threshold;

based on a determination that the first measurement associated with the first ULP cell is below the first threshold, performing a second measurement on a second ULP cell associated with a first Uu cell and a third measurement on a third ULP cell associated with a second Uu cell;

determining a measurement offset based on an association between the third ULP cell and the second Uu cell;

determining a signal quality associated with the second ULP cell and a signal quality associated with the third ULP cell, wherein the signal quality associated with the second ULP cell is based on the second measurement, and wherein the signal quality associated with the third ULP cell is based on the third measurement and the determined measurement offset;

selecting a ULP cell from the second ULP cell and the third ULP cell based on the determined signal qualities, wherein the selected ULP cell is associated with a highest signal quality; and using the selected ULP cell.

11. The method of claim 10, wherein using the selected ULP cell comprises camping on the selected ULP cell using ULP configuration information.

12. The method of claim 10, wherein the first Uu cell is a serving Uu cell and the second Uu cell is a neighboring Uu cell, and wherein a wireless transmit/receive unit (WTRU) is not connected to the second Uu cell at a time associated with the performed second measurement and third measurement.

13. The method of claim 10, wherein for the signal quality associated with the second ULP cell a measurement offset associated with the second ULP cell is zero or an offset for the second ULP cell is not applied.

14. The method of claim 10, further comprising:

detecting an out-of-ULP service event, wherein the detecting of the out-of-ULP service event is based on a determination that the first measurement, the second measurement, and the third measurement are below a second threshold;

based on the detected out-of-ULP service event, obtaining Uu configuration information associated with a third Uu cell; and camping on the third Uu cell using the obtained Uu configuration information.

15. The method of claim 10, further comprising:

camping on the third ULP cell and the second Uu cell; and camping on the second Uu cell based on a connection establishment latency constraint.

* * * * *